(12) United States Patent
Fujii et al.

(10) Patent No.: US 6,883,016 B1
(45) Date of Patent: Apr. 19, 2005

(54) ELECTRONIC MAIL TERMINAL DEVICE AND METHOD OF CONTROLLING THE SAME

(75) Inventors: Takanori Fujii, Kanagawa (JP); Shigeru Katsuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 843 days.

(21) Appl. No.: 09/610,812

(22) Filed: Jul. 6, 2000

(30) Foreign Application Priority Data

Jul. 8, 1999 (JP) .......................... 11-194746
Sep. 24, 1999 (JP) .......................... 11-271054

(51) Int. Cl.[7] .............................. G06F 15/16
(52) U.S. Cl. .................. 709/203; 709/224; 709/216; 709/217; 358/422; 713/320; 713/321; 713/322; 713/323; 713/324
(58) Field of Search .................. 709/203, 206–207, 709/223–224, 216–217, 208, 209; 358/422, 402; 713/320–324, 201, 202

(56) References Cited

U.S. PATENT DOCUMENTS 5,729,667 A 3/1998 Lee
5,764,864 A 6/1998 Sujita

FOREIGN PATENT DOCUMENTS

| EP | 0358441 | 3/1990 |
|---|---|---|
| EP | 0801492 | 10/1997 |
| JP | 05260229 | 10/1993 |
| JP | 10-91294 | 4/1998 |
| JP | 10091294 | 4/1998 |
| JP | 10133835 | 5/1998 |
| JP | 10164123 | 6/1998 |

*Primary Examiner*—Jack B. Harvey
*Assistant Examiner*—Hieu Le
(74) *Attorney, Agent, or Firm*—Cooper & Dunham LLP

(57) ABSTRACT

An electronic mail terminal device having a power-saving function, and a method of controlling such an electronic mail terminal device are provided. When electronic mail is neither being fetched nor being transmitted, a local area network communication unit is in a sleep mode in the electronic mail terminal device of the present invention. Accordingly, the power consumption of the local area network unit can be dramatically reduced.

54 Claims, 26 Drawing Sheets

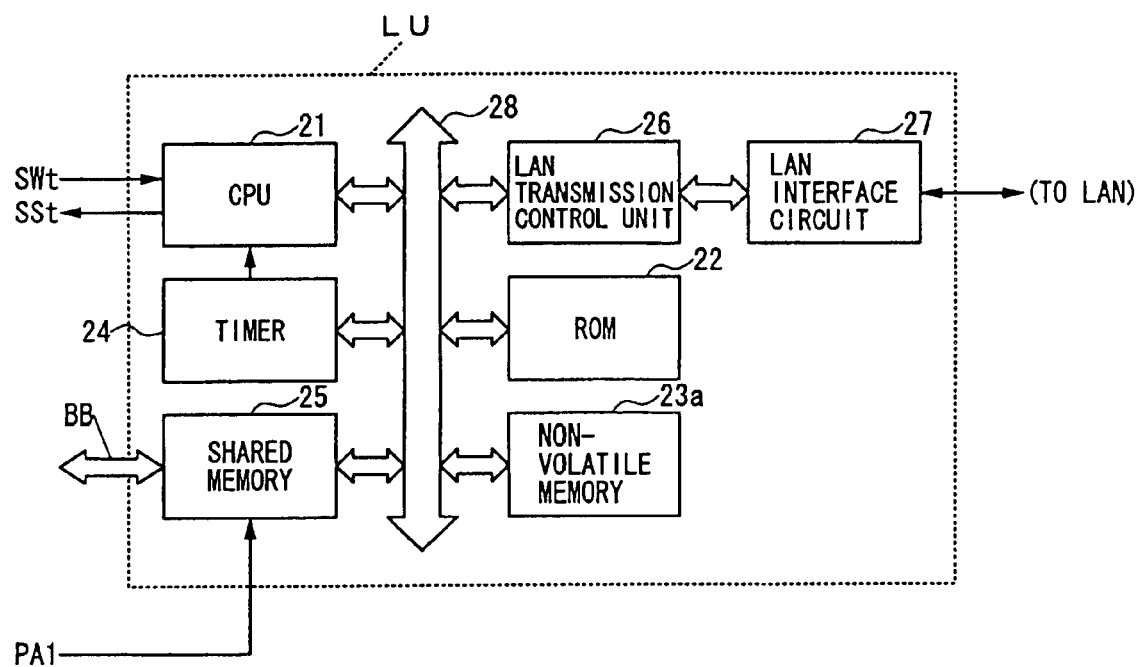
F I G. 2 1

ELECTRONIC MAIL TERMINAL DEVICE AND METHOD OF CONTROLLING THE SAME

BACKGROUND OF THE INVENTION

1. Field of the Invention

The present invention relates to an electronic mail terminal device that transmits and receives information through electronic mail, and to a method of controlling such a device.

2. Description of the Related Art

In recent years, more and more network facsimile devices that are connected to a local area network or to the Internet and transmit and receive image information through electronic mail have been put into practical use. The ITU-T recommendations have set the T.37 recommendation and the T.38 recommendation as the standards for those Internet facsimile devices.

The ITU-T recommendation T. 37 specifies an electronic mail Internet facsimile communication method for exchanging image information through electronic mail via the Internet. The ITU-T recommendation T. 38 specifies a real-time Internet facsimile communication method for exchanging real-time image information via the Internet in accordance with the Group-3 facsimile transmission procedure (the ITU-T recommendation T.30 procedure).

In general, a network facsimile device has a function of exchanging image information via a public network, and a function of exchanging image information via a public network and the Internet through the electronic mail Internet facsimile communication function and the real-time Internet facsimile communication function.

A network facsimile device having functions according to the recommendation T.37 makes an access to a mail server, in which the device has an account, at predetermined time intervals so as to fetch electronic mail addressed to the device.

The above network facsimile device also has a power-saving function of restricting the power consumption while the device is in a stand-by state.

Japanese Laid-Open Patent Application Nos. 10-91294 and 10-133835 both disclose such a power-saving function in a terminal device that performs electronic mail exchange.

In the former reference, however, the mail server needs to have a function of notifying each client device of electronic mail reception. In the latter reference, besides a network facsimile device, it is necessary to employ a printing device to print out received image information. Because of this, the technique disclosed in this reference cannot be applied to a case where only a single network facsimile device is used.

SUMMARY OF THE INVENTION

It is the principal object of the present invention to provide an electronic mail terminal device having a power-saving function, and a method of controlling such an electronic mail terminal device, in which the above-mentioned problems are eliminated.

To achieve the above object, the present invention provides an electronic mail terminal device that transmits and receives information through electronic mail, comprising:

a communication unit that is connected to a network and performs electronic mail data exchange via the network; and a power-saving control unit that sets the communication unit and the device into a power-saving mode when the device detects that a first power-saving timing condition is satisfied, and cancels the power-saving mode when the device detects that a second power-saving timing condition is satisfied.

In the above electronic mail terminal device, the communication unit is a local area network communication unit that is connected to a local area network and performs electronic data exchange via the local area network, the first power-saving timing condition is that a stand-by state lasts longer than a predetermined period of time, and the second power-saving timing condition is that an event occurs.

In the above electronic mail terminal device, the power-saving control unit cancels the power-saving mode at predetermined mail fetching intervals so as to fetch electronic mail addressed to the device through the local area network communication unit.

In the above electronic mail terminal device, the power-saving control unit cancels the power-saving mode of the local area network communication unit at the predetermined mail fetching intervals so as to fetch electronic mail addressed to the device through the local area network communication unit, where electronic mail has been fetched, the power-saving control unit canceling the power-saving mode of the device and outputting electronic mail information to the device through the local area network communication unit, and where no electronic mail has been fetched, the power-saving control unit not canceling the power-saving mode of the device, and setting the local area network communication unit back into the power-saving mode after a stand-by state lasts longer than the predetermined period of time.

In the above electronic mail terminal device, the mail fetching intervals may be set at will. Also, the mail fetching intervals may have a different value set in each time zone.

In another embodiment of the electronic mail terminal device of the present invention, the communication unit is a dial-up communication unit that makes a dial-up access to an Internet service provide via a public network, and performs electronic mail data exchange via the Internet;

the first power-saving timing condition is that a stand-by state lasts longer than a predetermined period of time; and the second power-saving timing condition is that an event occurs.

In the above electronic mail terminal device, the power-saving control unit cancels the power-saving mode at predetermined mail fetching intervals so as to fetch electronic mail addressed to the device through the dial-up communication unit.

In the above electronic mail terminal device, the power-saving control unit cancels the power-saving mode of the dial-up communication unit at the predetermined mail fetching intervals so as to fetch electronic mail addressed to the device, where electronic mail has been fetched, the power-saving control unit canceling the power-saving mode of the device and outputting electronic mail information to the device through the dial-up communication unit, and where no electronic mail has been fetched, the power-saving control unit not canceling the power-saving mode of the device and then setting the dial-up communication unit back into the power-saving mode after a stand-by state lasts longer than the predetermined period of time.

In the above electronic mail terminal device, the mail fetching intervals may be set at will. Also, the mail fetching intervals have a different value set in each time zone.

The present invention also provides a method of controlling an electronic mail terminal device that transmits and receives information through electronic mail, said method comprising the steps of:

putting the device and a communication unit, which is connected to a network and performs electronic mail data exchange via the network, into a power-saving mode, when the device detects that a first power-saving timing condition is satisfied; and canceling the power-saving mode when the device detects that a second power-saving timing condition is satisfied.

In this method, the power-saving mode setting step includes the step of setting the device and a local area network communication unit, which is connected to a local area network and performs electronic mail data exchange via the local area network, into the power-saving mode, when a stand-by state lasts longer than a predetermined period of time; and the canceling step includes the step of canceling the power-saving mode when an event occurs.

Further in the above method, the canceling step includes the step of canceling the power-saving mode at predetermined mail fetching intervals so as to fetch electronic mail addressed to the device through the local area network communication unit.

Further in the above method, the canceling step includes the step of cancelling the power-saving mode of the local area network communication unit at the predetermined mail fetching intervals so as to fetch electronic mail addressed to the device through the local area network communication unit. This method further comprises the steps of:

where electronic mail has been fetched, outputting electronic mail information to the device through the local area network communication unit after cancelling the power-saving mode of the device; and where no electronic mail has been fetched, setting the local area network communication unit back into the power-saving mode when a stand-by state lasts longer than the predetermined period of time, not canceling the power-saving mode of the device.

In the above method, the mail fetching intervals may be set at will. Also, a different value may be set in each time zone for the mail fetching intervals.

In another embodiment of the method of the present invention, the power-saving mode setting step includes the step of setting the device and a dial-up communication unit, which makes an dial-up access to an Internet service provider via a public network and performs electronic mail data exchange via the Internet, into a power-saving mode, when a stand-by state lasts longer than a predetermined period of time; and the canceling step includes the step of canceling the power-saving mode when an event occurs.

In the above method, the canceling step includes the step of canceling the power-saving mode at predetermined mail fetching intervals so as to fetch electronic mail addressed to the device through the dial-up communication unit.

Further in the above method, the canceling step includes the step of canceling the power-saving mode of the dial-up communication unit at the predetermined mail fetching intervals so as to fetch electronic mail addressed to the device. This method further comprises the steps of:

where electronic mail has been fetched, outputting electronic mail information to the device through the dial-up communication unit after canceling the power-saving mode of the device; and where no electronic mail has been fetched, setting the dial-up communication unit back into the power-saving mode when a stand-by state lasts longer than the predetermined period of time, not canceling the power-saving mode of the device.

In the above method, the mail fetching intervals may be set at will. Also, a different value may be set in each time zone of the mail fetching intervals.

In yet another embodiment of the electronic mail terminal device of the present invention, the power-saving control unit cancels the power-saving mode of the local area network communication unit at the predetermined mail fetching intervals so as to fetch electronic mail addressed to the device through the local area network communication unit; and where no electronic mail has been fetched, the power-saving control unit prolongs the mail fetching intervals by a prescribed arithmetic operation.

In the above electronic mail terminal device, where electronic mail has been fetched, the power-saving control unit resets the mail fetching intervals to the original predetermined mail fetching intervals.

Further in the above electronic mail terminal device, where no electronic mail has been fetched, the power-saving control unit prolongs the mail fetching intervals by a prescribed arithmetic operation, not canceling the power-saving mode of the device, and sets the local area network communication unit back into the power-saving mode when a stand-by state lasts longer than the predetermined period of time, and where electronic mail has been fetched, the power-saving control unit cancels the power-saving mode of the device, outputs electronic mail information to the device through the local area network communication unit, and then resets the mail fetching intervals to the original predetermined mail fetching intervals.

In still another embodiment of the electronic mail terminal device of the present invention, the power-saving control unit cancels the power-saving mode of the dial-up communication unit at the predetermined mail fetching intervals so as to fetch electronic mail addressed to the device through the dial-up communication unit;

where no electronic mail has been fetched, the power-saving control unit prolongs the mail fetching intervals by a prescribed arithmetic operation; and where electronic mail has been fetched, the power-saving control unit resets the mail fetching intervals to the original predetermined mail fetching intervals.

In the above electronic mail terminal device, where no electronic mail has been fetched, the power-saving control unit prolongs mail fetching intervals by a prescribed arithmetic operation, not canceling the power-saving mode of the device, and sets the dial-up communication unit back into the power-saving mode when a stand-by state lasts longer than the predetermined period of time; and where electronic mail has been fetched, the power-saving control unit cancels the power-saving mode of the device, outputs electronic mail information to the device through the dial-up communication unit, and then resets the mail fetching intervals to the original predetermined mail fetching intervals.

In yet another embodiment of the electronic mail terminal device of the present invention comprising a local area network communication unit, where no electronic mail has been fetched, the power-saving control unit prolongs the mail fetching intervals by the prescribed arithmetic operation, and resets the mail fetching interval to the original predetermined mail fetching intervals at a predetermined time.

In the above electronic mail terminal device, where no electronic mail has been fetched, the power-saving control unit prolongs the mail fetching interval by the prescribed arithmetic operation, not canceling the power-saving mode of the device, and then sets the local area network communication unit back into the power-saving mode when a stand-by state lasts longer than the predetermined period of time;

where electronic mail has been fetched, the power-saving control unit cancels the power-saving mode of the device, and outputs electronic mail information to the device through the local area network communication unit; and at the predetermined time, the power-saving control unit resets the mail fetching intervals to the original predetermined mail fetching intervals.

In still another embodiment of the electronic mail terminal device comprising a dial-up communication unit, where no electronic mail has been fetched, the power-saving control unit prolongs the mail fetching intervals by the prescribed arithmetic operation, and resets the mail fetching intervals to the original predetermined mail fetching intervals at a predetermined time.

In the above electronic mail terminal device, where no electronic mail has been fetched, the power-saving control unit prolongs the mail fetching intervals by the prescribed arithmetic operation, not canceling the power-saving mode of the device, and sets the dial-up communication unit back into the power-saving mode when a stand-by state lasts longer than the predetermined period of time;

where electronic mail has been fetched, the power-saving control unit cancels the power-saving mode of the device, and outputs electronic mail information to the device through the dial-up communication unit; and at the predetermined time, the power-saving control unit resets the mail fetching intervals to the original predetermined mail fetching intervals.

In any applicable one of the above embodiments, the electronic mail terminal device may further includes a semiconductor non-volatile memory that stores the mail fetching intervals. Also, the arithmetic operation may be selected from a plurality of prescribed arithmetic operations by a user.

In yet another embodiment of the method of the present invention using a local area network communication unit, the canceling step includes the step of canceling the power-saving mode of the local area network communication unit at the predetermined mail fetching intervals so as to fetch electronic mail addressed to the device through the local area network communication unit. This method further comprises the step of, where no electronic mail has been fetched, prolonging the mail fetching intervals by a prescribed arithmetic operation.

In the above method, where electronic mail has been fetched, resetting the prolonged mail fetching intervals to the original predetermined mail fetching intervals.

In the above method, the canceling step includes the step of canceling the power-saving mode of the local area network communication unit at the predetermined mail fetching intervals so as to fetch electronic mail addressed to the device through the local area network communication unit. This method further comprises the steps of:

where no electronic mail has been fetched, prolonging the mail fetching intervals by the prescribed arithmetic operation, not canceling the power-saving mode of the device, and then setting the local area network communication unit back into the power-saving mode when a stand-by state lasts longer than the predetermined period of time; and where electronic mail has been fetched, canceling the power-saving mode of the device, outputting electronic mail information to the device through the local area network communication unit, and then resetting the mail fetching intervals to the original predetermined mail fetching intervals.

In still another embodiment of the method of the present invention using a dial-up communication unit, the canceling step includes the step of canceling the power-saving mode of the dial-up communication unit at the mail fetching intervals so as to fetch electronic mail addressed to the device through the dial-up communication unit. This method further comprises the steps of:

where no electronic mail has been fetched, prolonging the mail fetching intervals by a prescribed arithmetic operation; and where electronic mail has been fetched, resetting the prolonged mail fetching intervals to the original predetermined mail fetching intervals.

In the above method, the canceling step includes the step of canceling the power-saving mode of the dial-up communication unit at the mail fetching intervals so as to fetch electronic mail addressed to the device through the dial-up communication unit. This method further comprises the steps of:

where no electronic mail has been fetched, prolonging the mail fetching intervals by a prescribed arithmetic operation, not canceling the power-saving mode of the device, and then setting the dial-up communication unit back into the power-saving mode when a stand-by state lasts longer than the predetermined period of time; and where electronic mail has been fetched, canceling the power-saving mode of the device, outputting electronic mail information to the device through the dial-up communication unit, and then resetting the prolonged mail fetching intervals to the original predetermined mail fetching intervals.

In yet another embodiment of the method of the present invention using a local area network communication unit, the canceling step includes the step of canceling the power-saving mode of the local area network communication unit at the predetermined mail fetching intervals so as to fetch electronic mail addressed to the device through the local area network communication unit. This method further comprises the steps of:

where no electronic mail has been fetched, prolonging the mail fetching intervals by a prescribed arithmetic operation; and at a predetermined time, resetting the prolonged mail fetching intervals to the original predetermined mail fetching intervals.

In the above method, the canceling step includes the step of canceling the power-saving mode of the local area network communication unit at the predetermined mail fetching intervals so as to fetch electronic mail addressed to the device through the local area network communication unit. This method further comprises the steps of:

where no electronic mail has been fetched, prolonging the mail fetching intervals by a prescribed arithmetic operation, not cancelling the power-saving mode of the device, and then setting the local area network communication unit back into the power-saving mode when a stand-by state lasts longer than the predetermined period of time;

where electronic mail has been fetched, canceling the power-saving mode of the device, and outputting electronic mail information to the device; and at a predetermined time, resetting the mail fetching intervals to the original predetermined mail fetching intervals.

In still another embodiment of the method of the present invention using a dial-up communication unit, the canceling step includes the step of canceling the power-saving mode of the dial-up communication unit at the mail fetching intervals so as to fetch electronic mail addressed to the device through the dial-up communication unit. This method further comprises the steps of:

where no electronic mail has been fetched, prolonging the mail fetching intervals by a prescribed arithmetic operation; and at a predetermined time, resetting the prolonged mail fetching intervals to the original predetermined mail fetching intervals.

In the above method, the canceling step includes the step of canceling the power-saving mode of the dial-up communication unit at the mail fetching intervals so as to fetch electronic mail addressed to the device through the dial-up communication unit. This method further comprises the steps of:

where no electronic mail has been fetched, prolonging the mail fetching intervals by a prescribed arithmetic operation, not canceling the power-saving mode of the device, and then setting the dial-up communication unit back into the power-saving mode when a stand-by state lasts longer than the predetermined period of time;

where electronic mail has been fetched, canceling the power-saving mode of the device, and outputting electronic mail information to the device through the dial-up communication unit; and at a predetermined time, resetting the mail fetching intervals to the original predetermined mail fetching intervals.

In any applicable one of the above embodiments of the method of the present invention, the mail fetching intervals are stored in a semiconductor non-volatile memory. Also, the arithmetic operation is selected from a plurality of prescribed arithmetic operations by a user.

In yet another embodiment of the electronic mail terminal device of the present invention, the communication unit is a local area network communication unit that is connected to a local area network and performs electronic mail data exchange via the local area network;

when a current time is within a predetermined nighttime zone, the power-saving control unit sets the local area network and the device into the power-saving mode; and when the current time comes out of the predetermined nighttime zone, the power-saving control unit cancels the power-saving mode of the local area network communication unit.

The above electronic mail terminal device further comprises a nighttime power-saving mode setting unit that determines whether or not a power-saving mode can be set in the predetermined nighttime zone. In this electronic mail terminal device, when the current time is within the predetermined nighttime zone, the power-saving control unit sets the device into the power-saving mode;

when the nighttime power-saving mode setting unit allows the power-saving mode in the nighttime zone, the power-saving control unit sets the local area network communication unit into the power-saving mode; and when the current time comes out of the nighttime zone, the power-saving control unit cancels the power-saving mode of the local area network communication unit.

In the above electronic mail terminal device, the power-saving control unit may provided with a timer for detecting an end of the nighttime zone, and, based on an output of the timer, cancels the power-saving mode of the local area network communication unit.

In still another embodiment of the electronic mail terminal device of the present invention, the communication unit is a dial-up communication unit that makes a dial-up access to an Internet service provider via a public network and performs electronic mail data exchange via the Internet;

when a current time is within a predetermined nighttime zone, the power-saving control unit sets the dial-up communication unit and the device into the power-saving mode; and when the current time comes out of the predetermined nighttime zone, the power-saving control unit cancels the power-saving mode of the dial-up communication unit.

The above electronic mail terminal device further comprises a nighttime power-saving mode setting unit that determined whether or not a power-saving mode can be set in the predetermined nighttime zone. In this electronic mail terminal device, when the current time is within the predetermined nighttime zone, the power-saving control unit sets the device into the power-saving mode;

when the nighttime power-saving mode setting unit allows the power-saving mode in the nighttime zone, the power-saving control unit sets the dial-up communication unit into the power-saving mode; and when the current time comes out of the nighttime zone, the power-saving control unit cancels the power-saving mode of the dial-up communication unit.

In the above electronic mail terminal device, the power-saving control unit may be provided with a timer for detecting an end of the nighttime zone, and, based on an output of the timer, cancels the power-saving mode of the dial-up communication unit.

In yet another method of the present invention, the power-saving mode setting step includes the step of setting the device and a local area network communication unit, which is connected to a local area network and performs electronic mail data exchange via the local area network, into the power-saving mode, when a current time is within a predetermined nighttime zone; and the canceling step includes the step of canceling the power-saving mode of the local area network communication unit when the current time comes out of the predetermined nighttime zone.

In the above method, the power-saving mode setting step includes the steps of:

when the current time is within the predetermined nighttime zone, setting the device into the power-saving mode; and when a nighttime power-saving mode setting unit determines that a power-saving mode can be set in the nighttime zone, setting the local area network communication unit into the power-saving mode; and the canceling step includes the step of, when the current time comes out of the night time zone, canceling the power-saving mode of the local area network communication unit.

In the above method, the canceling the power-saving mode of the local area network communication unit may be carried out based on an output of a timer that is disposed in the electronic mail terminal device and detects an end of the nighttime zone.

In still another embodiment of the method of the present invention, the power-saving mode setting step includes the step of setting the device and a dial-up communication unit, which makes a dial-up access to an Internet service provider via a public network and performs electronic mail data exchange via the Internet, into the power-saving mode, when a current time is within a predetermined nighttime zone; and the canceling step includes the step of cancelling the power-saving mode of the dial-up communication unit when the current time comes out of the predetermined nighttime zone.

In the above method, the power-saving mode setting step includes the steps of:

when the current time is within the predetermined nighttime zone, setting the device into the power-saving mode; and when a nighttime power-saving mode setting unit determines that a power-saving mode can be set in the nighttime zone, setting the dial-up communication unit into the power-saving mode; and the canceling step includes the step of, when the current time comes out of the night time zone, canceling the power-saving mode of the dial-up communication unit.

In the above method, the canceling the power-saving mode of the dial-up communication unit may be carried out based on an output of a timer that is disposed in the electronic mail terminal device and detects an end of the nighttime zone.

As described so far, in accordance with the present invention, when electronic mail is neither being fetched nor being transmitted, the local area network communication unit is in a sleep mode. Thus, the power consumption by the local area network unit can be dramatically reduced.

In a case where no electronic mail has been fetched, the electronic mail terminal device is not returned from the power-saving mode, so that unnecessary power consumption can be avoided.

Also in accordance with the present invention, when electronic mail is neither being fetched nor being transmitted, the dial-up communication unit is in a sleep mode. Thus, the power consumption by the dial-up communication unit can be dramatically reduced.

The power-saving mode can be set in the nighttime zone, so that a greater power-saving effect can be achieved.

In a case where no electronic mail has been fetched in the nighttime zone, the mail fetching intervals are prolonged. Accordingly, unnecessary power consumption can be effectively restricted, and a greater power-saving effect can be achieved.

Other objects and further features of the present invention will become more apparent from the following description taken in conjunction with the accompanying drawings.

BRIEF DESCRIPTION OF THE DRAWINGS

FIG. 21 is a block diagram of a modified structure of the local area network unit LU;

DESCRIPTION OF THE PREFERRED EMBODIMENTS

The following is a description of embodiments of the present invention, with reference to the accompanying drawings.

Figure 1:
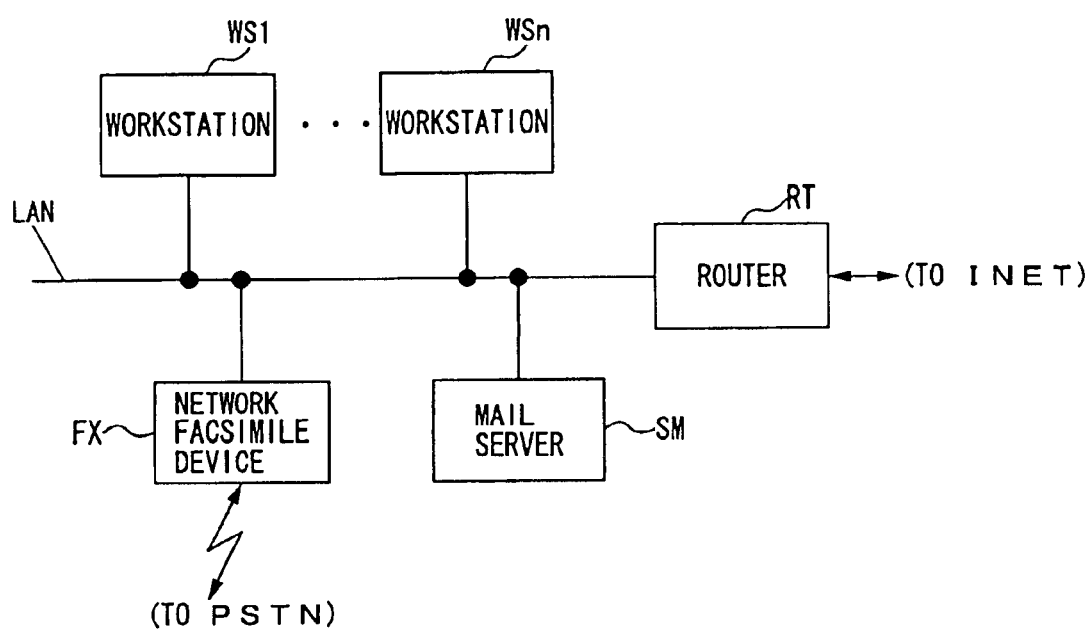
FIG. 1 is a block diagram of the structure of a network system in accordance with a first embodiment of the present invention.

FIG. 1 is a block diagram of a network system in accordance with a first embodiment of the present invention. In this figure, workstations WS1 to WSn, a mail server SM, and a network facsimile device FX are connected to a local area network LAN. The local area network LAN is connected to the Internet via a router RT, so that the workstations WS1 to WSn, the mail server SM, and the network facsimile device FX can exchange various kinds of data with host terminals connected to other local area networks.

The mail server SM provides services such as electronic mail collection and distribution for users of the workstations WS1 to WSn and the network facsimile machine that are connected to the local area network LAN.

The workstations WS1 to WSn are provided with various programs such as application software for exchanging data via the local area network LAN and for processing image data contained in electronic mail received through the network facsimile device FX. The workstations WS1 to WSn are used by one or more authorized users.

The network facsimile device FX has a function of transmitting and receiving data in the local area network LAN, a function of exchanging information with the workstations WS1 to WSn through a point-to-point transmission protocol, a function of carrying out an FTP process and an HTTP process with the mail server SM, and a function of transmitting image data through a transmission protocol of a Group-3 facsimile machine connected to a public switched telephone network PSTN and using the public switched telephone network PSTN as a transmission path. The network facsimile device FX has a power-saving function of restricting power consumption during a stand-by operation.

In this embodiment, data exchange among the terminals (the workstations WS1 to WSn, the network facsimile device FX, and the mail server SM) connected to the local area network LAN is basically carried out by employing the combination of a transmission protocol up to the transport layer, which is the TCP/IP (Transmission Control Protocol/Internet Protocol), and a communication protocol above the transport layer (this combination is a so-called "protocol suit"). In electronic mail data exchange, a communication protocol called SMTP (Simple Mail Transfer Protocol) is used, for instance.

As a protocol used by each terminal for confirming electronic mail reception and requesting electronic mail transmission, the so-called POP (Post Office Protocol) can be employed.

The communication protocols such as the TCP/IP, SMTP, and POP, and the electronic mail data formats and data structures, are specified in the RFC (Request For Comments) issued by the IETF (Internet Engineering Task Force), which is an organization for summarizing Internet technologies. For instance, the TCP is defined in the RFC 793, the IP in the RFC 793, the SMTP in the RFC 821, the electronic mail formats in the RFC 822, the RFC 1521, and the RFC 1522 (the MIME (Multi-Purpose Mail Extension) format), and the protocol for exchanging facsimile image data through the electronic mail in the RFC 2305.

Figure 2:
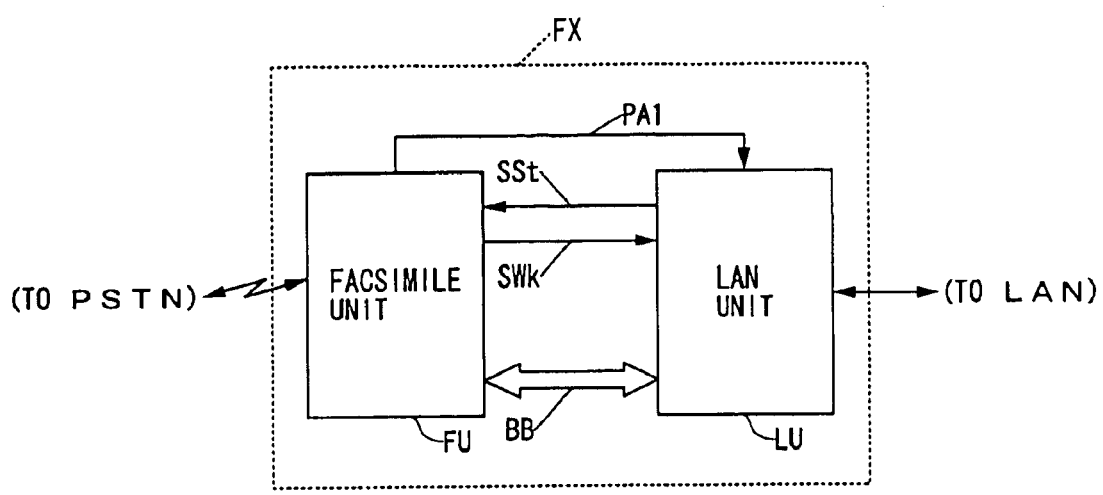
FIG. 2 is a block diagram of an example structure of a network facsimile device FX.

FIG. 2 shows an example structure of the network facsimile device FX. The network facsimile device FX comprises a facsimile unit FU having a facsimile transmission function and a local area network unit LU connected to the local area network LAN so as to transmit and receive electronic mail via the local area network LAN.

The facsimile unit FU outputs a power source (stand-by power source) PA1 and an activating command signal SWk for activating the local area network unit LU in a power-saving mode, to the local area network unit LU. The local area network unit LU outputs a return command signal SSt for activating the facsimile unit FU in a power-saving mode, to the facsimile unit FU.

The facsimile unit FU and the local area network unit LU are connected to each other by a control bus BB, so that various kinds of data can be exchanged between the facsimile unit FU and the local area network unit LU.

Figure 3:
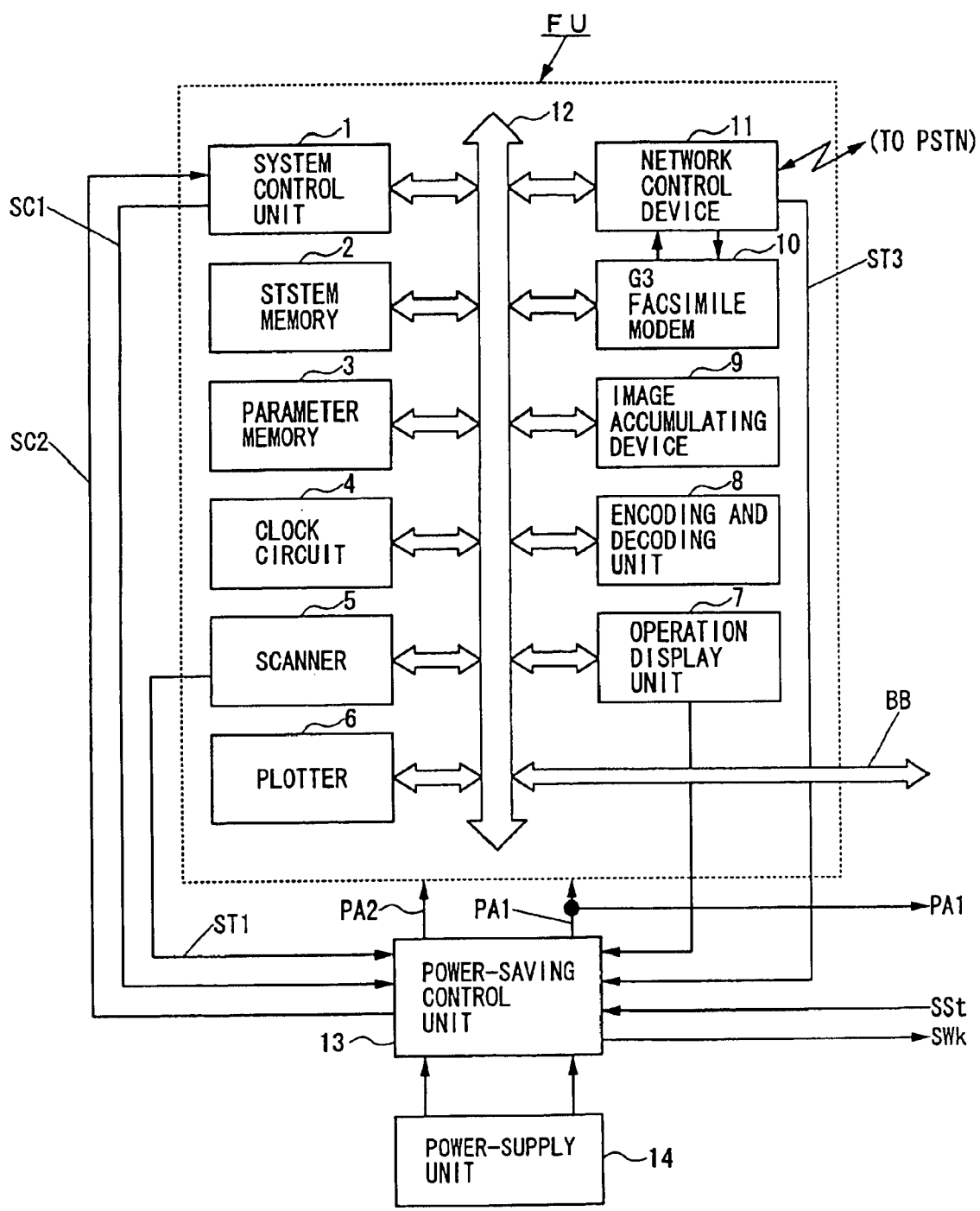
FIG. 3 is a block diagram of an example structure of a facsimile unit FU in the network facsimile device FX of FIG. 2.

FIG. 3 shows an example structure of the facsimile unit FU. In this facsimile unit FU, a system control unit 1 performs various control processes such as a facsimile transmission control protocol. A system memory 2 stores various kinds of data required by the system control unit 1 for performing control programs, and also serves as a work area for the system control unit 1. A parameter memory 3 stores various kinds of information inherent to the facsimile unit FU. A clock circuit 4 outputs current time information. A scanner 5 reads an original image at predetermined resolution. A plotter 6 records and outputs an image at predetermined resolution. An operation display unit 7 is used to operate the network facsimile device FX, and comprises various operation keys and displays. An encoding and decoding unit 8 encodes and compresses an image signal, and decodes the encoded and compresses image information into the original image data. An image accumulating device 9 stores a large amount of encoded and compresses image information. A Group-3 facsimile modem 10 serves as a modem for a Group-3 facsimile machine, and has low-speed modem function (V.21 modem) for exchanging transmission protocol signals and a high-speed modem function (V.17 modem, V.34 modem, V.29 modem or V.27-ter. modem) mainly for exchanging image information. A network control unit 11 connects the network facsimile device FX to a public switched telephone network PSTN, and has automatic calling and receiving functions.

The system control unit 1, the system memory 2, the parameter memory 3, the clock circuit 4, the scanner 5, the plotter 6, the operation display unit 7, the encoding and decoding unit 8, the image accumulating device 9, the Group-3 facsimile modem 10, and the network control unit 11, are all connected to an internal bus 12. Data exchange among those components is generally carried out via the internal bus 12.

The data exchange between the network control unit 11 and the Group-3 facsimile modem 10 is directly carried out.

A power-saving control unit 13 reduces the power consumption during a stand-by operation. More specifically, the power-saving control unit 13 turns power sources outputted form a power supply unit 14 into the stand-by power source PA1 and a main power source PA2, and then supplies the power source PA1 and PA2 to each of the components of the facsimile unit FU. The stand-by power source PA1 is also supplied to the local area network unit LU.

The power-saving control unit 13 also exchanges the activating command signal SWk and the return command signal SSt with the local area network unit LU.

Also in the facsimile unit FU, events for detecting a switch from a power-saving mode to a normal operation mode includes an activating command input from the operation display unit 7, read document setting to the scanner 5, detection of a call from the analog public switched telephone network PSTN. In order to detect those events, the stand-by power source PA1 is constantly supplied to the operation display unit 7, the scanner 5, a document detecting unit (not shown), and the network control unit 11, while only the main power source PA2 is supplied to the remaining components.

A signal SC1 for instructing to move into the power-saving mode is outputted from the system control unit 1 to the power-saving control unit 13. A signal SC2 for instructing to return from the power-saving mode and notifying of a power-saving mode canceling factor is outputted from the power-saving control unit 13 to the system control unit 1.

A signal ST1 for notifying that a read document has been set is outputted from the scanner 5 to the power-saving control unit 13. A signal ST2 for notifying that an activating instruction has been inputted is outputted from the operation display unit 7 to the power-waving control unit 13. A signal ST3 for notifying that a call from the analog public switched telephone network PSTN has been detected is outputted from the network control unit 11 to the power-saving control unit 13.

Figure 4:
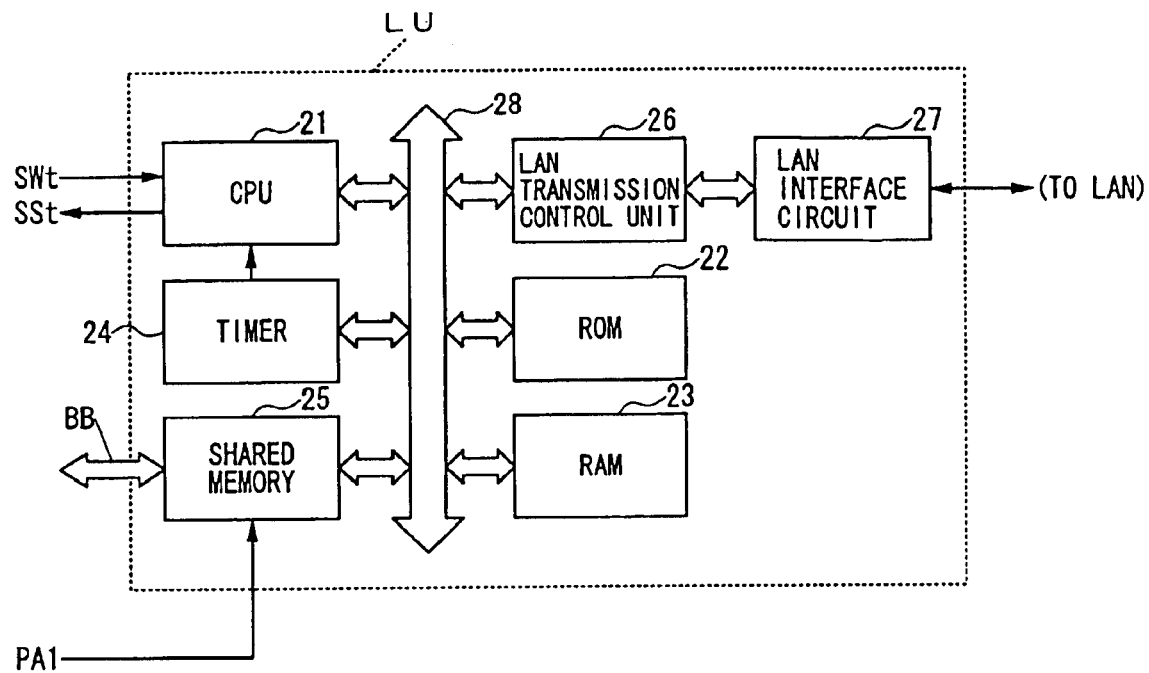
FIG. 4 is a block diagram of an example structure of a local area network unit LU in the network facsimile device FX of FIG. 2.

FIG. 4 shows an example structure of the local area network unit LU. In this local area network unit LU shown in FIG. 4, a CPU (Central Processing Unit) 21 has a clock function, and controls the operation of the local area network unit LU. A ROM (Read-Only Memory) 22 stores a control program and the like to be executed by the CPU 21. A RAM (Random-Access Memory) 23 serves as a work area of the CPU 21. A timer 24 measures a time set by the CPU 21, and when completing the time measuring, notifies the CPU 21 that the time has run out.

A shared memory 25 is connected to the control bus BB, and carries out transmission data exchange and control data exchange between the system control unit 1 of the facsimile unit FU and the CPU 21 of the local area network unit LU.

A local area network transmission control unit 26 performs communication control processes (such as electronic mail transmission and reception processes) so as to exchange various kinds of data with other data terminal devices via the local area network LAN. A local area network interface circuit 27 connects the network facsimile device FX to the local area network LAN.

The CPU 21, the ROM 22, the RAM 23, the timer 24, the shared memory 25, and the local area network transmission control unit 26, are all connected to an internal bus 28, so that data exchange among those components is carried out via the internal bus 28.

In this embodiment, the network facsimile device FX is connected to the mail server SM at predetermined intervals so as to fetch electronic mail addressed to the network facsimile device FX. While being connected to the mail server SM, the network facsimile device FX inquires whether or not any electronic mail addressed to the network facsimile device FX itself is stored. If electronic mail addressed to the network facsimile device FX is stored, the network facsimile device FX fetches the stored electronic mail.

Figure 5:
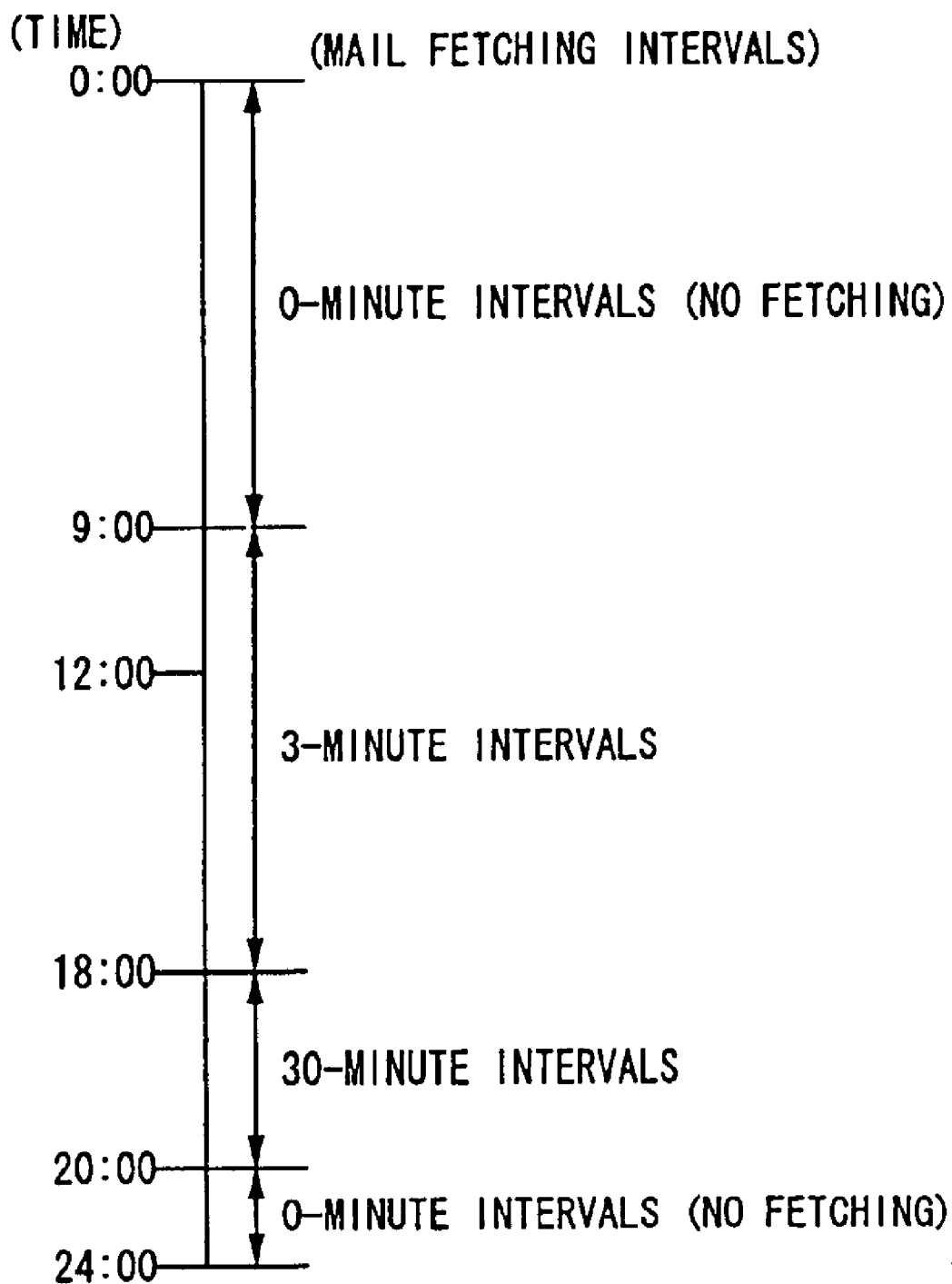
FIG. 5 shows example mail fetching intervals.

The mail fetching intervals are determined by the operation status of an area in which the network facsimile device FX is disposed. FIG. 5 shows example mail fetching intervals.

In FIG. 5, electronic mail is fetched every 3 minutes from 9 a.m. to 6 p.m., every 30 minutes from 6 p.m. to 8 p.m. The mail fetching intervals are set at 0 from 8 p.m. to 9 a.m. next day, during which no mail fetching is carried out. A user can set the mail fetching intervals at will in each time zone.

The setting information of the mail fetching intervals is registered in the local area network unit LU, and, based on the set mail fetching intervals, the local area network unit LU automatically fetches electronic mail.

In network facsimile device having the above structure, if a power-saving key (not shown) disposed on the operation display unit 7 is pressed or a stand-by state has lasted longer than a predetermined period of time, the system control unit 1 outputs the signal SC1 to the power-saving control unit 13 to instruct the local area network unit LU to move into the power-saving mode. At this point, the power-saving control unit 13 stops the supply of the main power source PA2 and outputs only the stand-by power source PA1, so that the network facsimile device FX moves into the power-saving mode.

When neither fetching nor transmitting electronic mail, the local area network unit LU sets the local area network transmission control unit 26 and the local area network interface circuit 27 into a sleep mode, so as to reduce the power consumption by the local area network transmission control unit 26 and the local area network interface circuit 27.

The electronic mail fetching operation is performed in the power-saving mode. If electronic mail is received in the power-saving mode, the CPU 21 outputs the return command signal SSt to the power-saving control unit 13. This input of the return command signal SSt is handled as a power-saving mode canceling event in the power-saving control unit 13.

Meanwhile, if the various events mentioned before occur in the power-saving mode, the power-saving control unit 13 switches on the main power source PA2, and outputs the signal SC2 to notify the system control unit 1 of the power-saving mode canceling factor. By doing so, the system control unit 1 is activated. Having received the signal SC2, the system control unit 1 determines that the power-saving mode has been canceled, and analyzes the power-saving mode canceling factor. Based on the analysis, the system control unit 1 performs a suitable operation.

Since the local area network transmission control unit 26 and the local area network interface circuit 27 are in the sleep mode when the local area network unit LU is neither fetching nor transmitting electronic mail, the power consumption by the local area network unit LU can be dramatically reduced in this embodiment.

Figure 6:
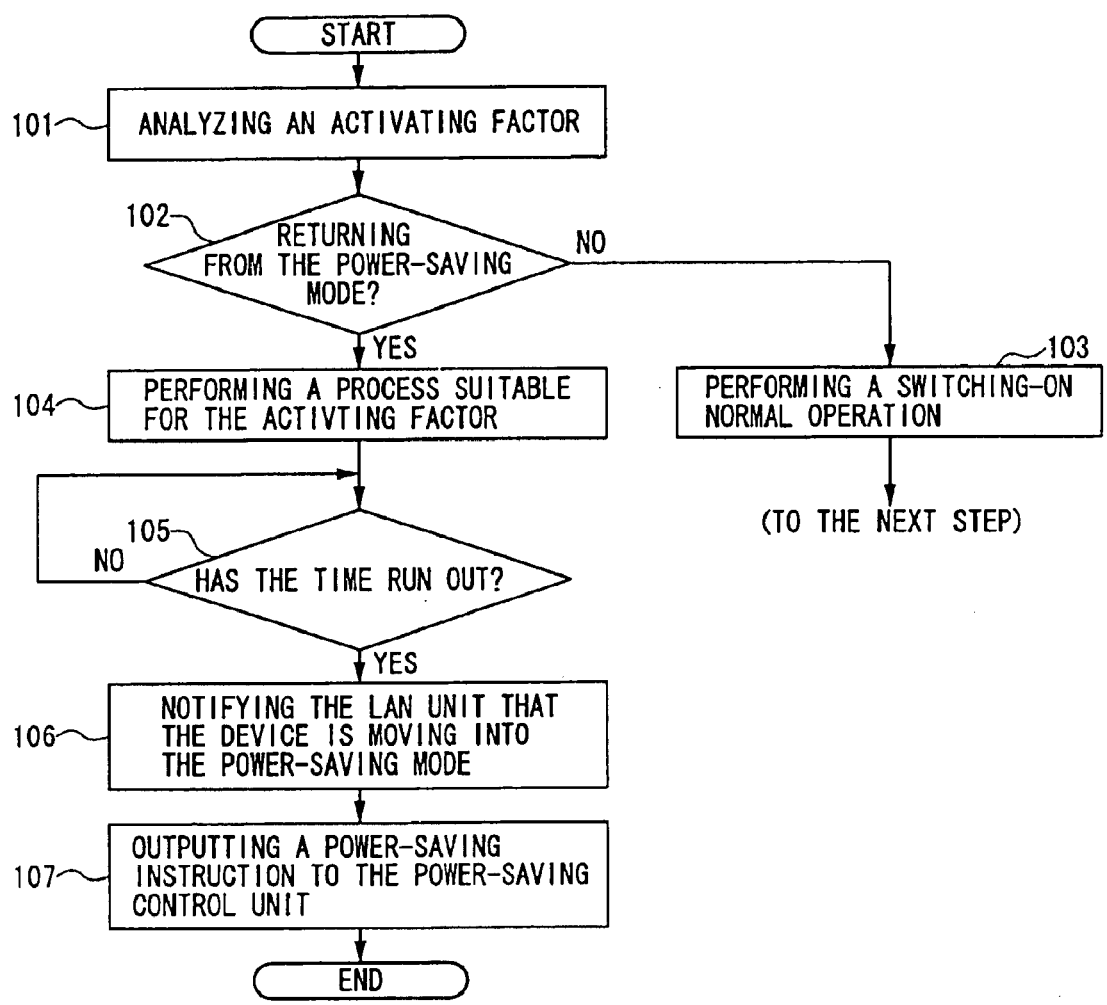
FIG. 6 is a flowchart of an example process performed by a system control unit of the facsimile unit FU when the system control unit is activated.

FIG. 6 shows an example process performed by the system control unit 1 when the system control unit 1 is activated.

First, the activating factor is analyzed in step 101. If the signal SC2 has already been received, it is determined that the power-saving mode has been canceled ("YES" in step 102). The system control unit 1 performs a process corresponding to the power-saving mode canceling factor notified by the signal SC2 in step 104. If the power-saving mode canceling factor is electronic mail reception, for instance, the system control unit 1 receives image information contained in the received electronic mail from the local area network unit LU, and records and outputs the received image information through the plotter 6.

Next, the system control unit 1 monitors whether or not the power-saving key (not shown) on the operation display unit 7 is pressed, or whether or not the stand-by state has lasted longer than a predetermined period of time, in step 105. If the result of step 105 is "YES", the system control unit 1 notifies the local area network unit LU that the facsimile unit FU is to move into the power-saving mode in step 106. The system control unit 1 then outputs the signal SC1 to the power-saving control unit 13 in step 107. Thus, the facsimile unit FU moves into the power-saving mode.

Meanwhile, if the activating factor is not canceling the power-saving mode, i.e., the result of step 102 is "NO", the system control unit 1 performs processes in the normal operation mode in step 103.

Figure 7:
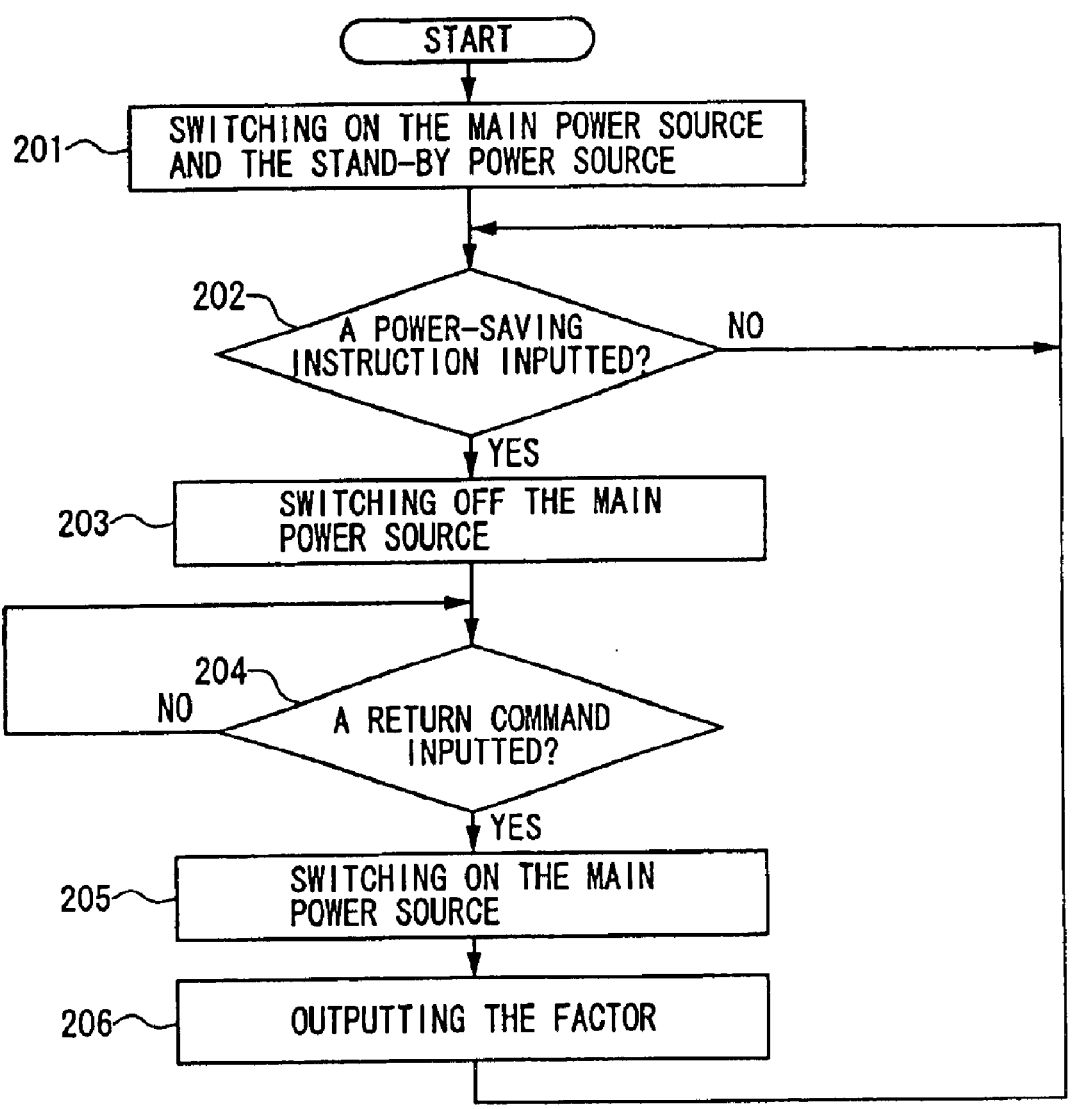
FIG. 7 is a flowchart of an example process performed by the power-saving control unit of the facsimile unit FU.

FIG. 7 shows an example process performed by the power-saving control unit 13.

First, the stand-by power source PA1 and the main power source PA2 are switched on in step 201, and the power-saving control unit 13 awaits an input of a power-saving instruction from the system control unit 1 ("NO" in step 202). When a power-saving instruction is inputted from the system control unit 1 ("YES" in step 202), the power-saving control unit 13 switches off the main power source PA2, and moves into the power-saving mode instep 203.

The power-saving control unit 13 then monitors whether or not a canceling event occurs ("NO" in step 204). When a canceling event occurs ("YES" in step 204), the power-saving control unit 13 switches on the main power source PA2 in step 205, and notifies the system control unit 1 of the power-saving canceling factor by the signal SC2 in step 206. The operation of the power-saving control unit 13 then returns to step 202.

Figure 8:
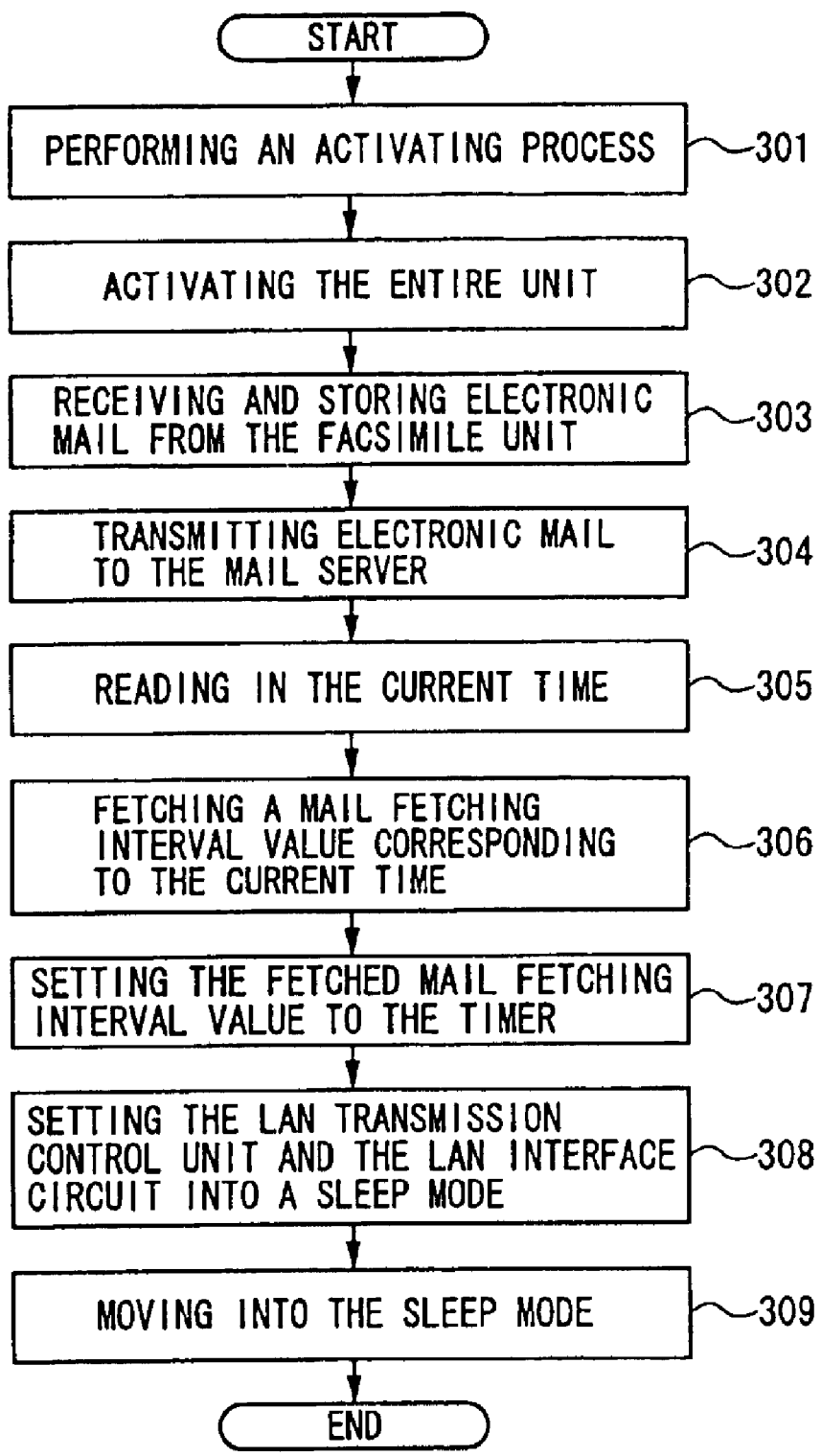
FIG. 8 is a flowchart of an example process performed by the local area network unit LU when the local area network unit LU is activated by the facsimile unit FU.

FIG. 8 is a flowchart of an example process performed by the local area network unit LU when the facsimile unit FU activates the local area network unit LU. This activation is carried out when the facsimile unit FU transmits electronic mail.

First, the CPU 21 performs a predetermined activating process in step 301, and then activates the entire local area network unit LU in step 302. The CPU 21 fetches electronic mail transmitted from the facsimile unit FU in step 303, and transmits the electronic mail to the mail server SM in step 304.

The current time is read in step 305, and a mail fetching interval corresponding to the current time is inputted in step 306. The inputted time data is set to the timer 24 in step 307. The local area network transmission control unit 26 and the local area network interface circuit 27 are set into a sleep mode in step 308. The CPU 21 then sets itself into the sleep mode in step 309. Here, this operation of the local area network unit comes to an end.

Figure 9:
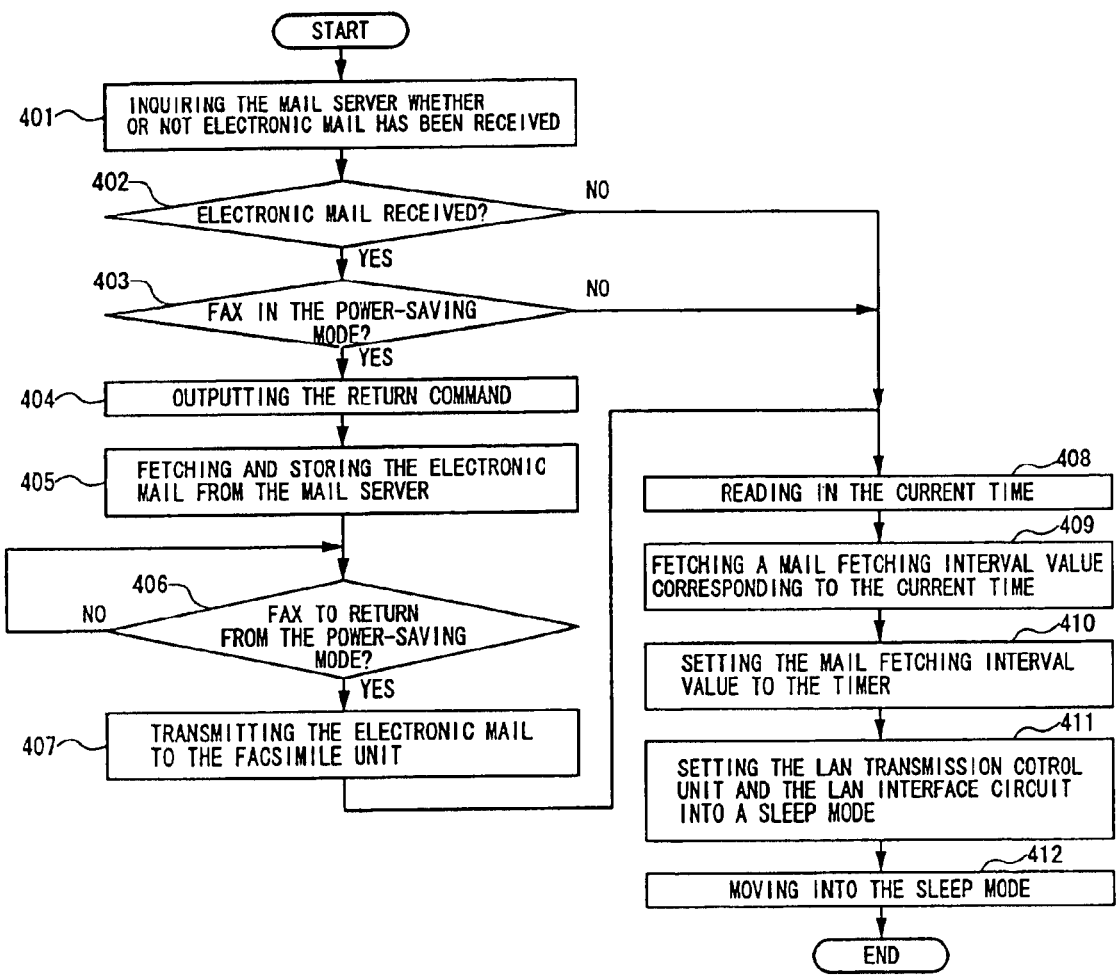
FIG. 9 is a flowchart of an example process performed by the local area network unit LU when the local area network unit LU is activated by a timer.

FIG. 9 is a flowchart of an example process performed by the local area network unit LU when the timer 24 activates the local area network unit LU.

First, the local area network unit LU communicates with the mail server SM, and inquires whether or not any electronic mail addressed to the network facsimile device FX is stored in step 401. If there is some electronic mail addressed to the network facsimile device FX ("YES" in step 402), it is determined whether or not the facsimile unit FU is in the power-saving mode in step 403.

If the result of step 403 is "YES", the CPU 21 outputs the return command signal SSt in step 404, electronic mail is fetched from the mail server SM and stored in step 405. The local area network unit LU then waits for the facsimile unit FU to return from the power-saving mode in step 406.

When the facsimile unit FU returns from the power-saving mode ("YES" in step 406), the contents of the stored electronic mail are transmitted to the facsimile unit FU in step 407.

The current time is read in step 408, and a mail fetching interval corresponding to the current time is inputted in step 409. The inputted time data is set to the timer in step 410. The local area network transmission control unit 26 and the local area network interface circuit 27 are put into the sleep mode in step 411. The CPU 21 also sets itself in the sleep mode in step 412, and this operation of the local area network unit LU comes to an end.

Meanwhile, if the result of step 402 is "NO", or the result of step 403 is "NO", the operation skips to step 408, and the steps that follow are carried out.

In this embodiment, the network facsimile device FX is connected to the local area network LAN, and electronic mail exchange is carried out via the local area network LAN. However, it is also possible for a network facsimile device to carry out the electronic mail exchange through the Internet by dial-up access.

Figure 10:
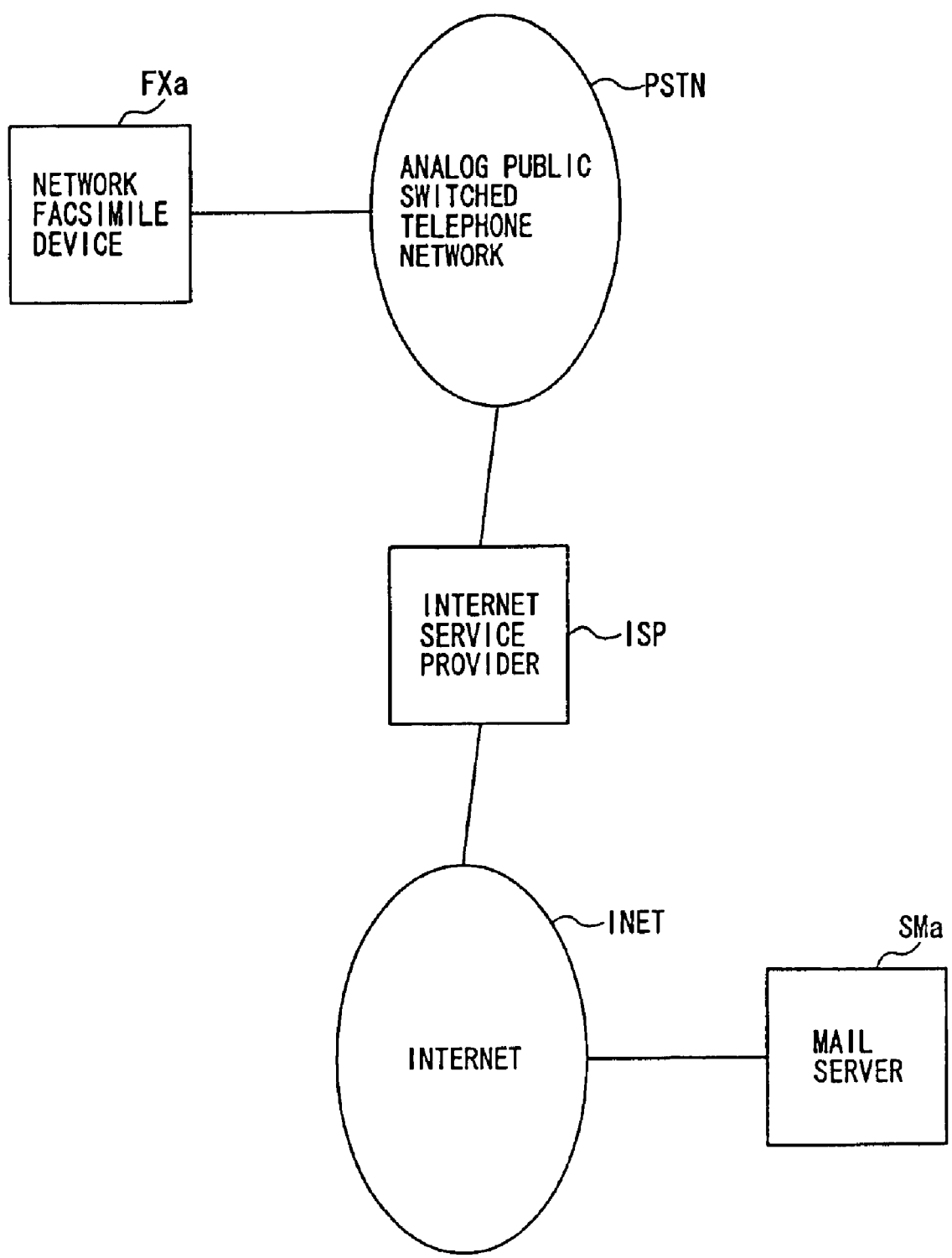
FIG. 10 is a block diagram of a network system in accordance with another embodiment of the present invention.

In such a case, a network facsimile device FXa makes a dial-up access to an Internet service provider ISP via an analog public switched telephone network PSTN, so that the network facsimile device FXa is connected to the Internet ITNET via the Internet service provider ISP, as shown in FIG. 10. In this system, electronic mail exchange is carried out between the network facsimile device FXa and the mail server SM on the Internet ITNET.

Further, it is also possible to utilize a mail server installed in the Internet service providers ISP. In this case, the Internet service providers ISP itself constitutes a part of the Internet INET, thereby making this structure equivalent to the structure shown in FIG. 10.

Figure 11:
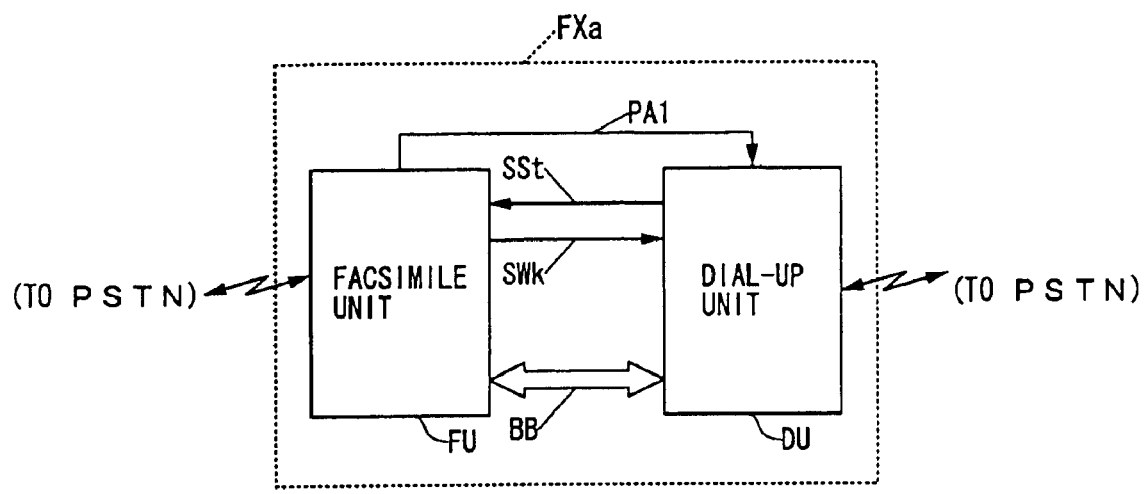
FIG. 11 is a block diagram of an example structure of a network facsimile device FXa shown in FIG. 10.

FIG. 11 shows an example structure of the network facsimile device FXa.

This network facsimile device FXa comprises a facsimile unit FU having a facsimile machine function, and a dial-up unit DU that makes a dial-up access to the Internet service provider ISP via the analog public switched telephone network PSTN and performs communication processes on the Internet INET.

A power source (stand-by power source) PA1 and an activating command signal SWk for activating the dial-up unit DU in the power-saving mode are outputted from the facsimile unit FU to the dial-up unit DU. A return command signal SSt for activating the facsimile unit FU in the power-saving mode is outputted from the dial-up unit DU to the facsimile unit FU.

The facsimile unit FU and the dial-up unit are connected to each other via a control bus BB, so that data exchange between the facsimile unit FU and the dial-up unit DU is carried out via the control bus BB.

Figure 12:
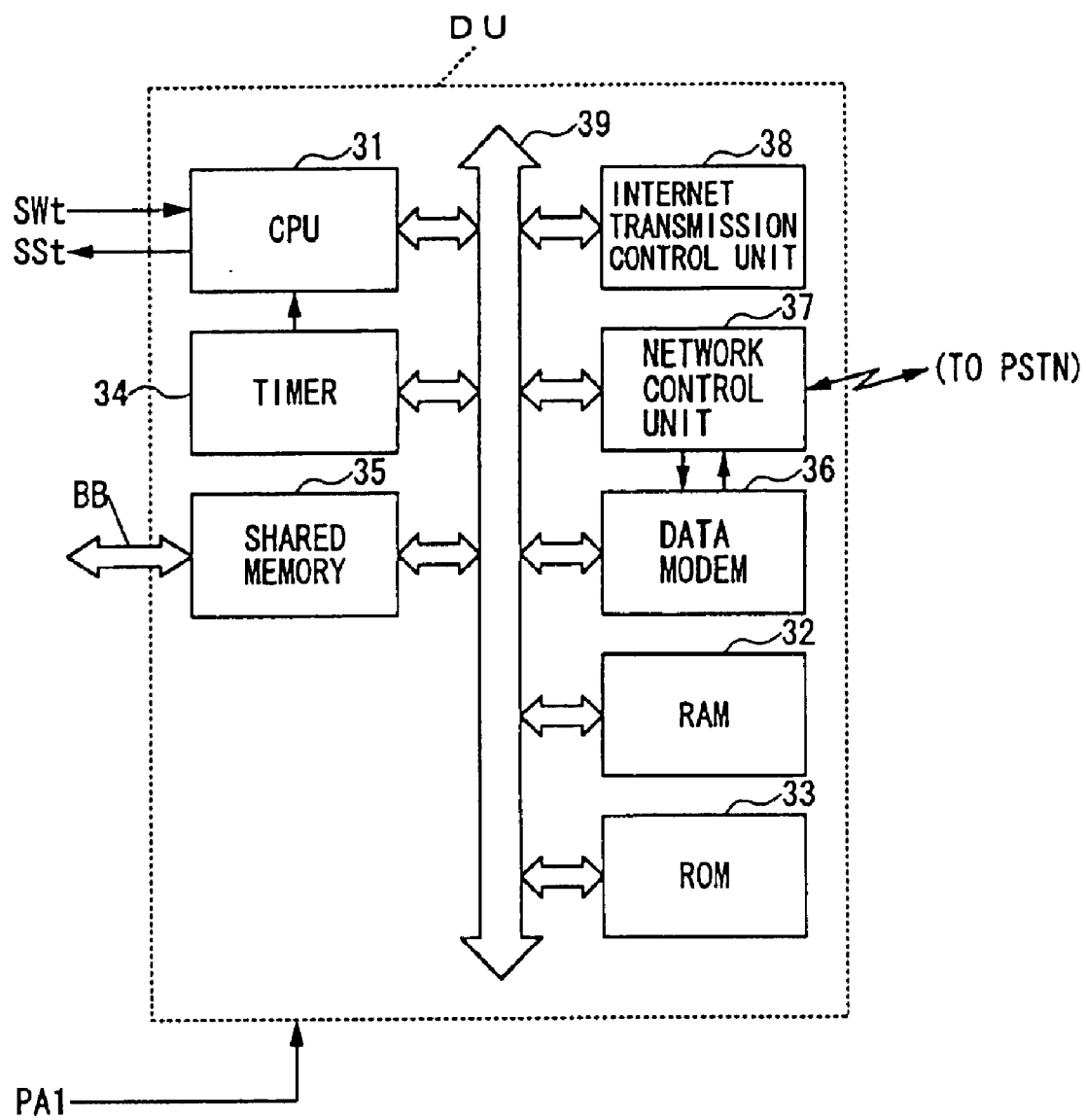
FIG. 12 is a block diagram of an example structure of a dial-up unit DU shown in FIG. 11.

FIG. 12 shows an example structure of the dial-up unit DU.

In FIG. 12, a CPU (Central Processing Unit) 31 has a clock function and control the operation of the dial-up unit DU. A ROM (Read-Only Memory) 32 stores control programs to be executed by the CPU 31. A RAM (Random-Access Memory) 33 serves as a work area for the CPU 31. A timer 34 measures a time set by the CPU 31, and when completing the time measuring, outputs a signal to notify the CPU 21 that the time has run out.

A shared memory 35 is connected to the control bus BB, and is used for exchanging various kinds of data (including transmission data and control data) between the system control unit 1 of the facsimile unit FU and the CPU 31 of the dial-up unit DU.

A data modem 36 is provided with a predetermined data modem function and is used for exchanging data with the Internet service provider ISP. A network control unit 37 is used for connecting the data modem 36 to a public network. Also, the network control unit 33 is used for making a dial-up access to the Internet service provider ISP, and therefore has only an automatic calling function.

An Internet transmission control unit 38 carries out communication control processes for exchanging various kinds of data between servers on the Internet and other data terminal devices via the data modem 36.

The CPU 31, the ROM 32, the RAM 33, the timer 34, the shared memory 35, the data modem 36, the network control unit 37, and the Internet transmission control unit 38, are all connected to an internal bus 39, so that data exchange among those components is carried out via the internal bus 39.

The operations of the network facsimile device FXa of this embodiment are substantially the same as the operations of the network facsimile device FX, except that the network facsimile device FXa makes a dial-up access and terminates a connection.

Figure 13:
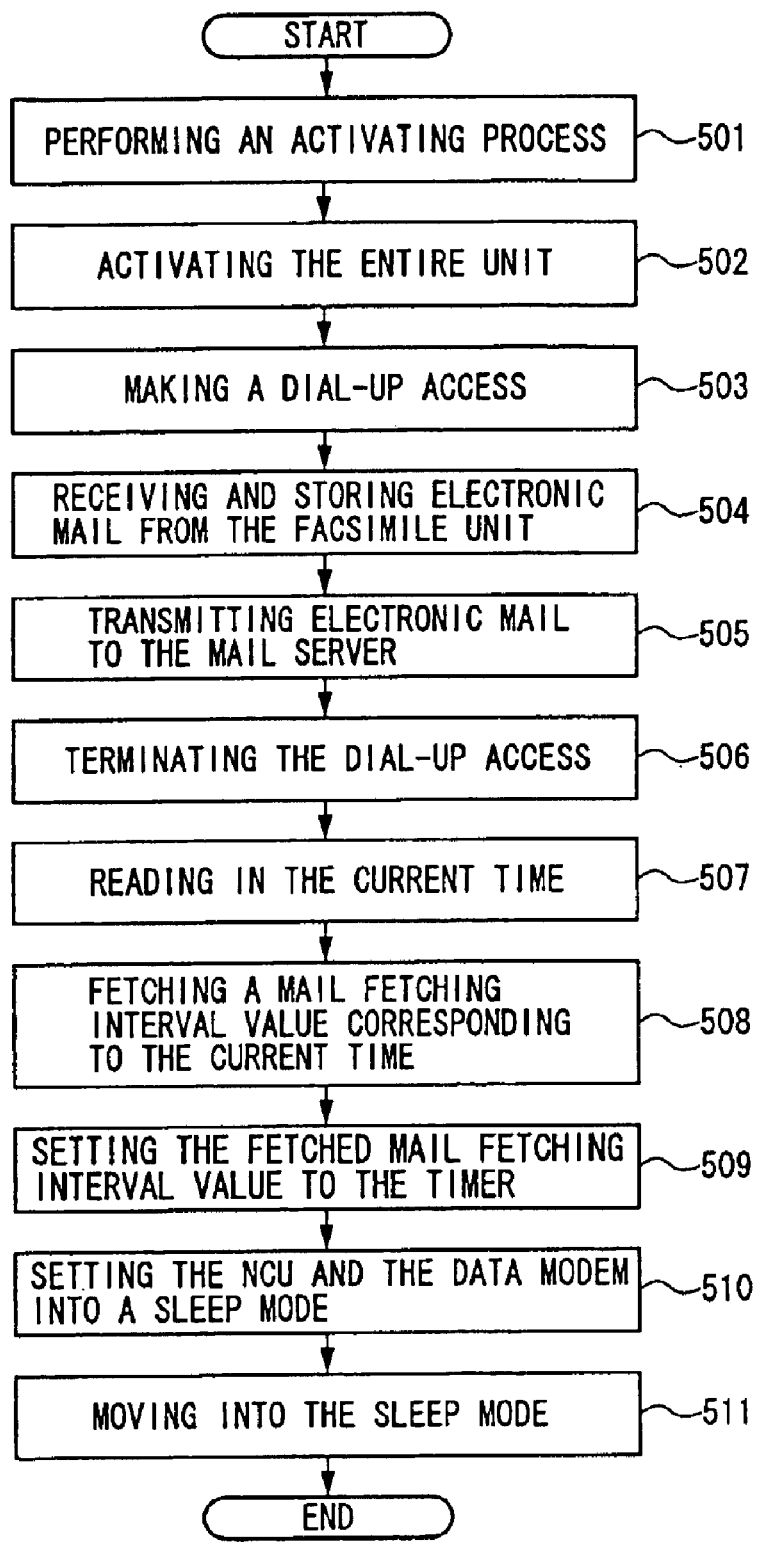
FIG. 13 is a flowchart of an example process performed by the dial-up unit DU when the dial-up unit DU is activated by the facsimile unit FU.

FIG. 13 is a flowchart of an example process performed by the dial-up unit DU when the facsimile unit FU activates dial-up unit DU. This activation is carried out when the facsimile unit FU transmits electronic mail.

First, the CPU 31 performs a predetermined activating process in step 501, and activates the entire dial-up unit DU in step 502. The CPU 31 then calls out the Internet service providers ISP, and makes a dial-up access to the Internet INET in step 503. Electronic mail transmitted from the facsimile unit FU is fetched in step 504, and the electronic mail is transmitted to the mail server SMa in step 505. The dial-up connection to the Internet INET is then terminated in step 506.

THE current time is read in process 507, and a mail fetching interval corresponding to the current time is inputted in step 508. The inputted time data is set to the timer 34 in step 509. The data modem 36, the network control unit 37, and the Internet transmission control unit 38 are put into the sleep mode in step 510. The CPU 31 then sets itself into the sleep mode in step 511, and this operation comes to an end.

Figure 14:
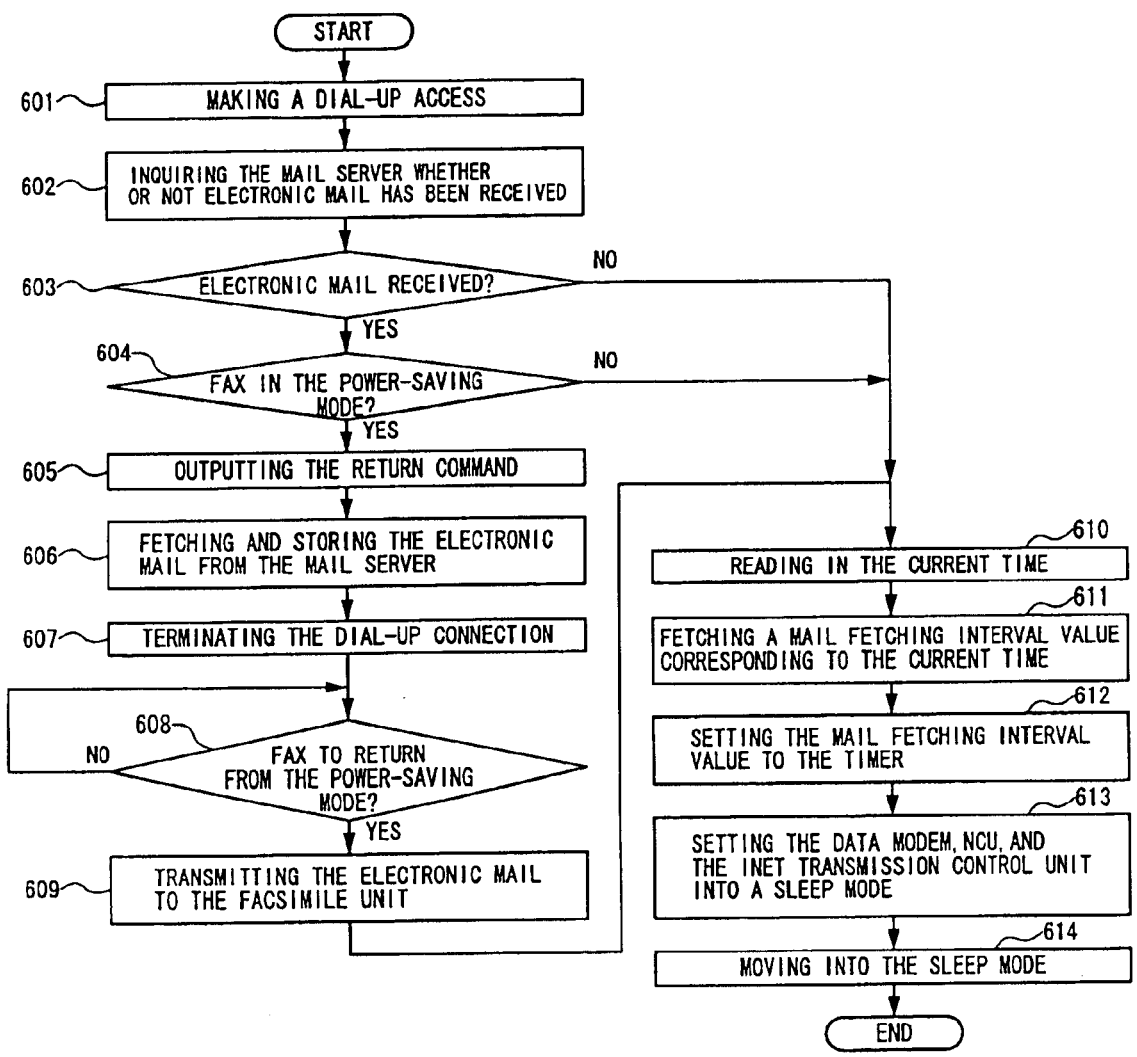
FIG. 14 is a flowchart of an example process performed by the dial-up unit DU when the dial-up unit DU is activated by a timer.

FIG. 14 is a flowchart of an example process performed by the dial-up unit DU when the timer 34 activates the dial-up unit DU.

First, the dial-up unit DU calls the Internet service provider ISP, and makes a dial-up access to the Internet INET in step 601. The dial-up unit DU is thus connected to the mail server SMa, and inquires whether or not any electronic mail addressed to the network facsimile device FXa is stored in step 602. If there is some electronic mail addressed to the network facsimile device FXa ("YES" in step 603), it is determined whether or not the facsimile unit FU is in the power-saving mode in step 604.

If the result of step 604 is "YES", the CPU 31 outputs the return command signal SSt in step 605. The electronic mail is fetched from the mail server SMa and then stored in step 606. The CPU 31 terminates the dial-up connection to the Internet INET in step 607, and waits for the facsimile unit FU to return from the power-saving mode in step 608.

When the facsimile unit FU returns from the power-saving mode ("YES" in step 608), the contents of the stored electronic mail are transmitted to the facsimile unit FU in step 609.

The current time is then read in step 610, and a mail fetching time corresponding to the current time is inputted in step 611. The inputted time data is set to the timer 34 in step 612. The data modem 36, the network control unit 37, and the Internet transmission control unit 38 are put into the sleep mode in step 613. The CPU 31 then sets itself into the sleep mode in step 614. Here, this operation of the dial-up unit DU comes to an end.

Meanwhile, if the result of step 603 is "NO" or the result of the step 604 is "NO", the operation skips to step 610, and the steps that follow are carried out.

As described so far, the data modem 36, the network device 37, and the Internet transmission control unit 38 are in the sleep mode, when electronic mail is neither fetched nor transmitted. Thus, the power consumption by the dial-up unit DU can be dramatically reduced in this embodiment.

A normal facsimile device is in the power-saving mode in a predetermined nighttime zone (from 8 p.m. to 8 a.m. next day). If the facsimile device receives a call in the nighttime zone, a normal receiving operation is performed, and received image information is accumulated. When accumulated image information is found after the nighttime zone, it is possible to record and output the received original of the accumulated image information in a nighttime power-saving mode.

Figure 15:
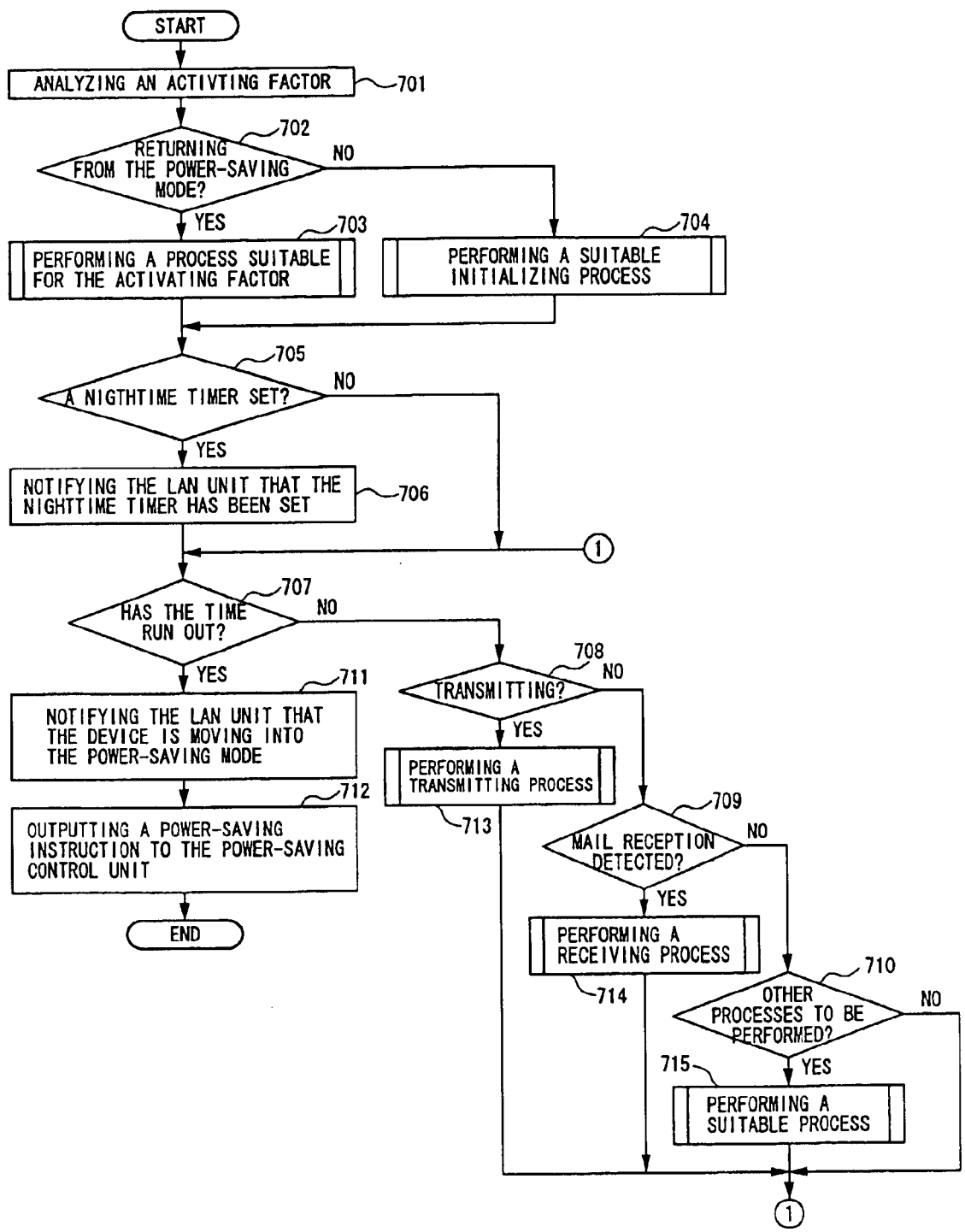
FIG. 15 is a flowchart of another example process performed by the system control unit when the system control unit is activated.

In a case where the network facsimile device FX shown in FIG. 2 is put into the nighttime power-saving mode, the system control unit 1 performs a predetermined process when activated. FIG. 15 is a flowchart of the predetermined process performed by the system control unit 1. Here, the facsimile unit FU and the local area network unit LU can be put into the nighttime power-saving mode independently of each other.

First, the activating factor is analyzed in step 701. If the signal SC2 has already been received, it is determined that the power-saving mode has been canceled ("YES" in step 702). The system control unit 1 performs a process corresponding to the power-saving mode canceling factor notified by the signal SC2 in step 703. If the power-saving mode canceling factor is electronic mail reception, for instance, the system control unit 1 receives image information contained in the received electronic mail from the local area network unit LU, and records and outputs the received image information through the plotter 6.

Meanwhile, if the power-saving mode canceling factor is not electronic mail reception ("NO" in step 702), an initializing process in the normal operation mode is carried out in step 704.

It is determined whether or not the nighttime power-saving mode is set in step 705. If the result of step 705 is "YES", the system control unit 1 notifies the local area network unit LU of the nighttime zone information and the setting of the nighttime power-saving mode in step 706. If the result of step 705 is "NO", step 706 is not carried out.

Next, the system control unit 1 monitors whether or not a power-saving key (not shown) provided on the operation display unit 7 is pressed, whether or not the stand-by state has lasted longer than a predetermined period of time, whether or not a transmission is carried out, whether or not a call reception is detected, and whether or not some other process is carried out in steps 707, 708, 709, and 710.

If the power-saving key (not shown) provided on the operation display unit 7 is pressed or the stand-by state has lasted longer than a predetermined period of time ("YES" in step 707), the system control unit 1 notifies the local area network unit LU that the facsimile unit FU is to move into the power-saving mode in step 711. The system control unit 1 outputs the signal SC1 to the power-saving control unit 13 in step 712, so that the facsimile unit FU moves into the power-saving mode.

If a transmission is carried out ("YES" in step 708), a predetermined transmitting process is performed in step 713, and the operation returns to step 707. If a call reception is detected ("YES" in step 709), a predetermined call receiving process is performed in step 714, and the operation returns to step 707. If some other process is carried out, a corresponding process is performed in step 715, and the operation returns to step 707.

Figure 16:
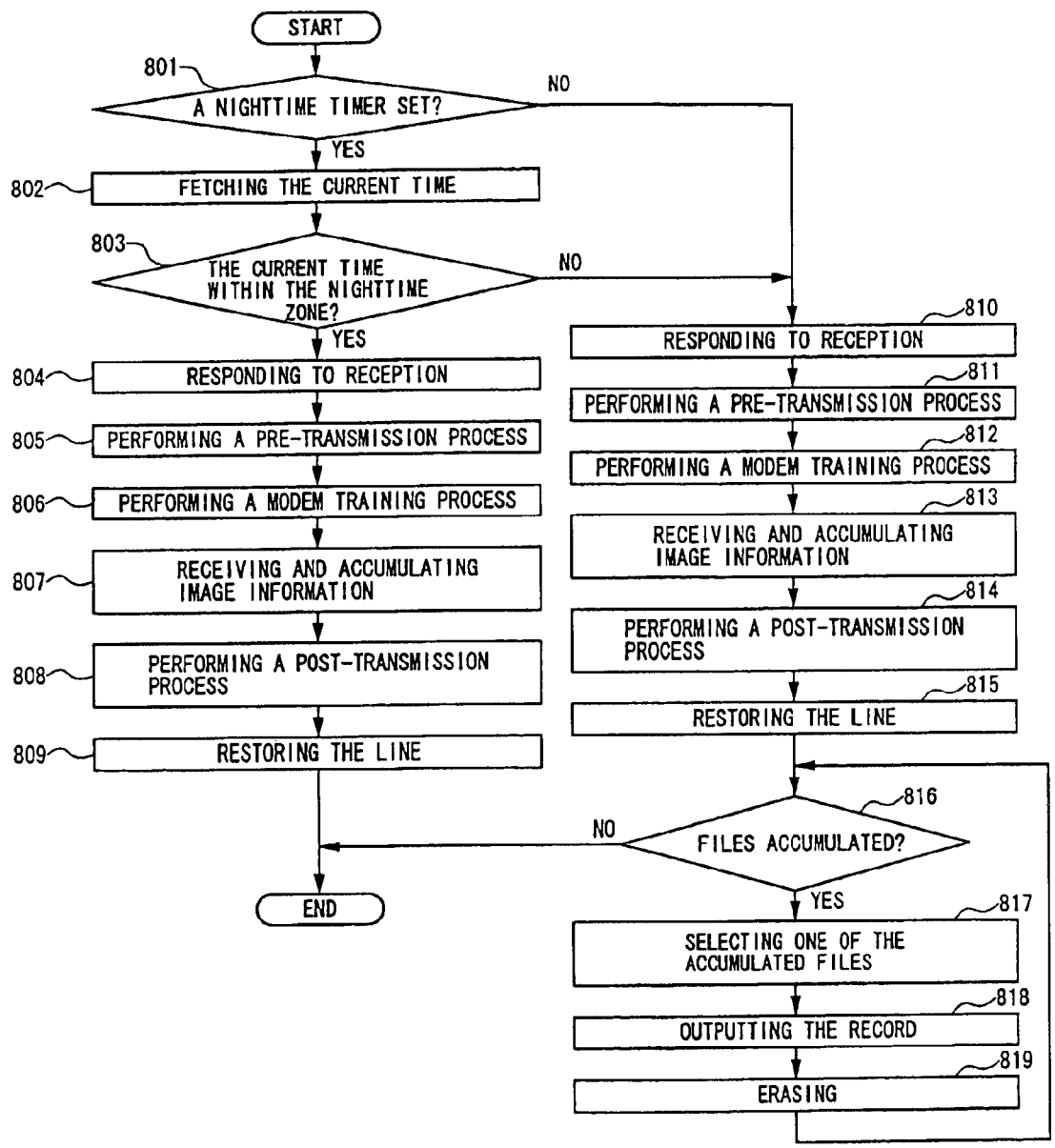
FIG. 16 is a flowchart of an example call receiving process in step 714 in the flowchart of FIG. 15.

FIG. 16 is a flowchart of an example process of the call receiving process (step 714).

First, it is determined whether or not the nighttime power-saving mode has been set in step 801. If it is determined that the nighttime power-saving mode has been set ("YES" in step 801), the current time is obtained from the clock circuit 4 in step 802. It is determined that the obtained current time is within the set nighttime zone in step 803.

If the current time is within the set nighttime zone ("YES" in step 803), a response is made to the call in step 804. A predetermined pre-transmission procedure is performed and a transmission function used for transmission the image information is determined in step 806. A modem training procedure is then performed in step 806. A modem speed used in the modem training procedure is determined, and the image information is received from a communicating terminal by a predetermined image information receiving process, and the received image information is stored in the image accumulating device 9 in step 807.

When the image information reception is finished, a predetermined post-transmission procedure is performed in step 808, and the line is reset in step 809. In this manner, the reception operation in the nighttime power-saving mode is completed.

Meanwhile, if it is determined that the nighttime power-saving has not been set ("NO" in step 801), or if the current time is not within the set nighttime zone ("NO" in step 803), a predetermined pre-transmission procedure is performed, and a transmission function used for transmitting the image information in step 811. A predetermined modem training procedure is performed in step 812, and the modem speed used in this procedure is determined. The image information is then received from the communicating terminal by a predetermined image information receiving procedure, and the received image information is decoded into the original image data by the encoding and decoding unit 8. The image data is transferred to the plotter 6, and the received original is recorded and outputted in step 813.

After the image information reception is completed, a predetermined post-transmission procedure is performed in step 814. The line is then reset in step 815, and the reception operation comes to an end.

It is determined whether or not received image information files which have not been recorded and outputted is accumulated in the image accumulating device 9 in step 816. If the result of step 816 is "YES", one of the received image information files is selected in step 817. The selected received image information file is read out from the image accumulating device 9, and the image information is decoded into the original image data by the encoding and decoding unit 8. The image data is transferred to the plotter 6, and the received original is recorded and outputted in step 818.

The recorded image information file is erased from the image accumulating device 9 in step 819, and the operation returns to step 816.

If the result of step 816 is "NO" when all the received image information files accumulated in the image accumulating device 9 are recorded and outputted, the operation comes to an end.

Figure 17:
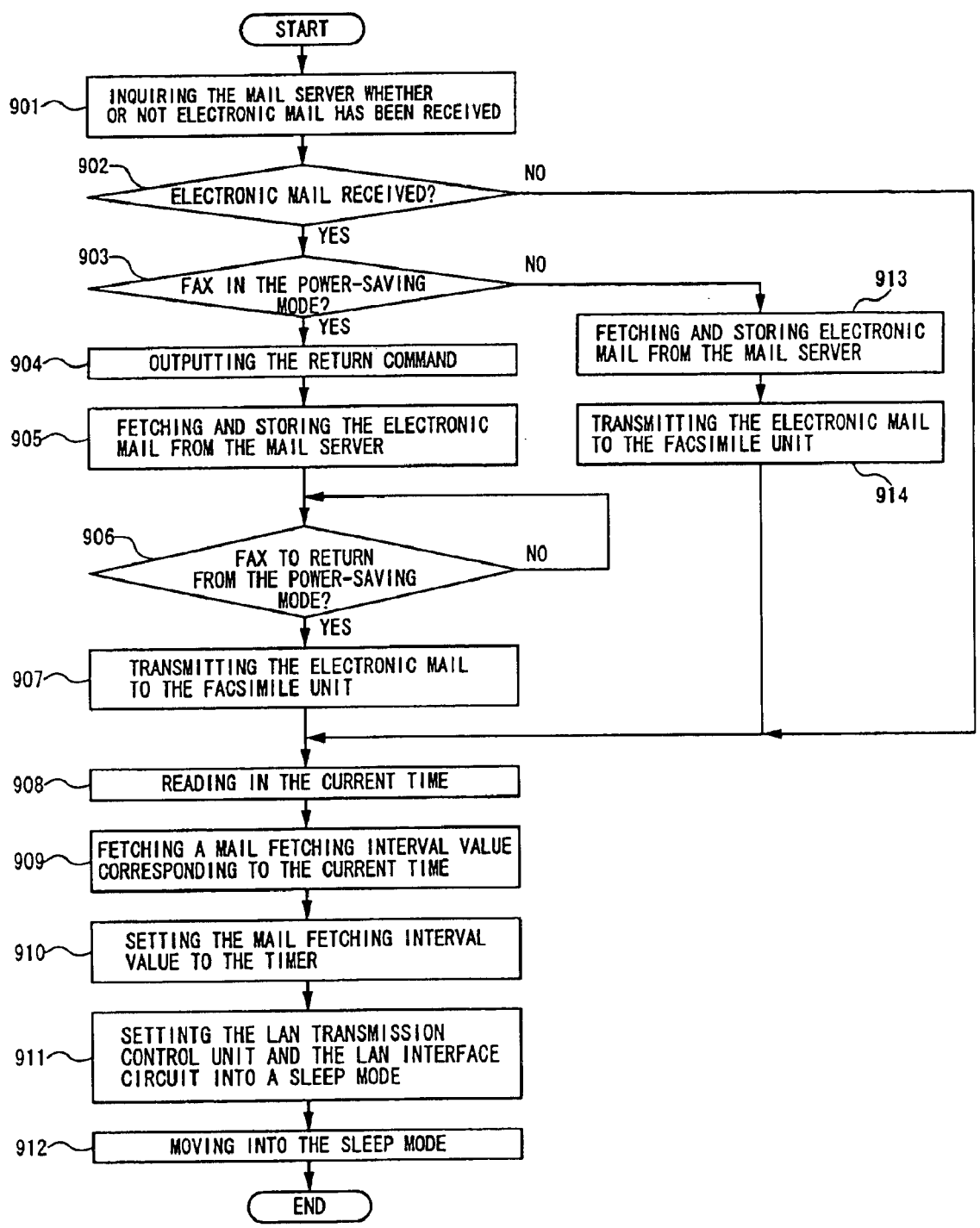
FIG. 17 is a flowchart of an example process performed by the local area network unit LU when the timer activates the local area network unit LU.

FIG. 17 is a flowchart of an example process performed by the local area network unit LU when the timer 24 activates the local area network unit LU.

First, the local area network unit LU makes an access to the mail server SM, and inquires whether or not any electronic mail addressed to the network facsimile device FX is stored in step 901. If there is some electronic mail addressed to the network facsimile device FX ("YES" in step 902), it is determined whether or not the facsimile unit FU is in the power-saving mode in step 903.

If the result of step 903 is "YES", the CPU 21 outputs the return command signal SSt in step 904. The electronic mail is fetched from the mail server SM, and then stored in step 905. The CPU 21 waits for the facsimile unit FU to return from the power-saving mode.

When the facsimile unit FU returns from the power-saving mode ("YES" in step 906), the contents of the stored electronic mail are transmitted to the facsimile unit FU in step 907.

Next, the current time is read in step 908, and a mail fetching interval corresponding to the current time is inputted in step 909. The inputted time data is set to the timer 24 in step 910. The local area network transmission control unit 26 and the local area network interface circuit 27 are then put into the sleep mode in step 911. The CPU 21 also sets itself into the sleep mode in step 912, and this operation of the local area network unit LU comes to an end.

Meanwhile, if the result of step 902 is "NO", the operation skips to step 908, and the steps that follow are carried out. Accordingly, if there is no received electronic mail, the facsimile unit FU is not activated, thereby avoiding unnecessary power consumption.

If it is determined that the facsimile unit FU is not in the power-saving mode ("NO" in step 903), electronic mail is fetched from the mail server SM and then stored in step 913, and the contents of the stored electronic mail are transmitted to the facsimile unit FU in step 914. The operation then skips to step 908, and the steps that follow are carried out.

Figure 18:
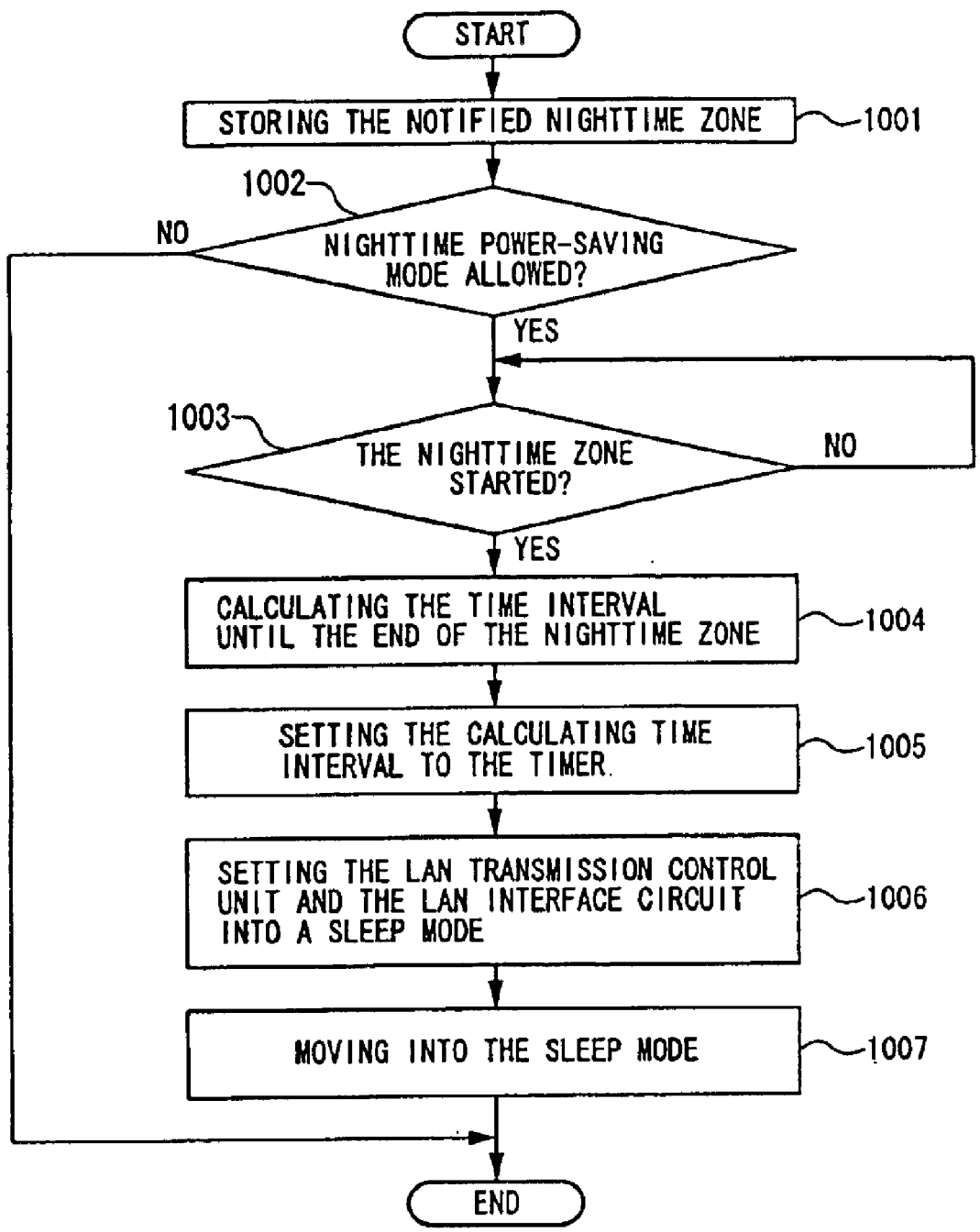
FIG. 18 is a flowchart of an example process performed by the CPU of the local area network unit LU in the nighttime power-saving mode.

FIG. 18 is a flowchart of an example process in the nighttime power-saving mode performed by the CPU 21 of the local area network unit LU after the facsimile unit FU transmits the nighttime zone information and the notification that the nighttime power-saving mode has been set.

First, the nighttime zone information is stored in step 1001, and it is determined whether or not the nighttime power-saving mode can be set in step 1002.

If it is determined that the nighttime power-saving mode can be set ("YES" in step 1002), the CPU 21 waits until the start time of the nighttime zone ("NO" in step 1003). When the starting time of the nighttime zone has come ("YES" in step 1003), the remaining time in the nighttime zone is calculated in step 1004, and the obtained time value is set to the timer 24 in step 1005. The local area network transmission control unit 26 and the local area network interface circuit 27 are then put into the sleep mode in step 1006. The CPU 21 also sets itself into the sleep mode in step 1007, and this operation of the CPU 21 comes to an end.

Figure 19:
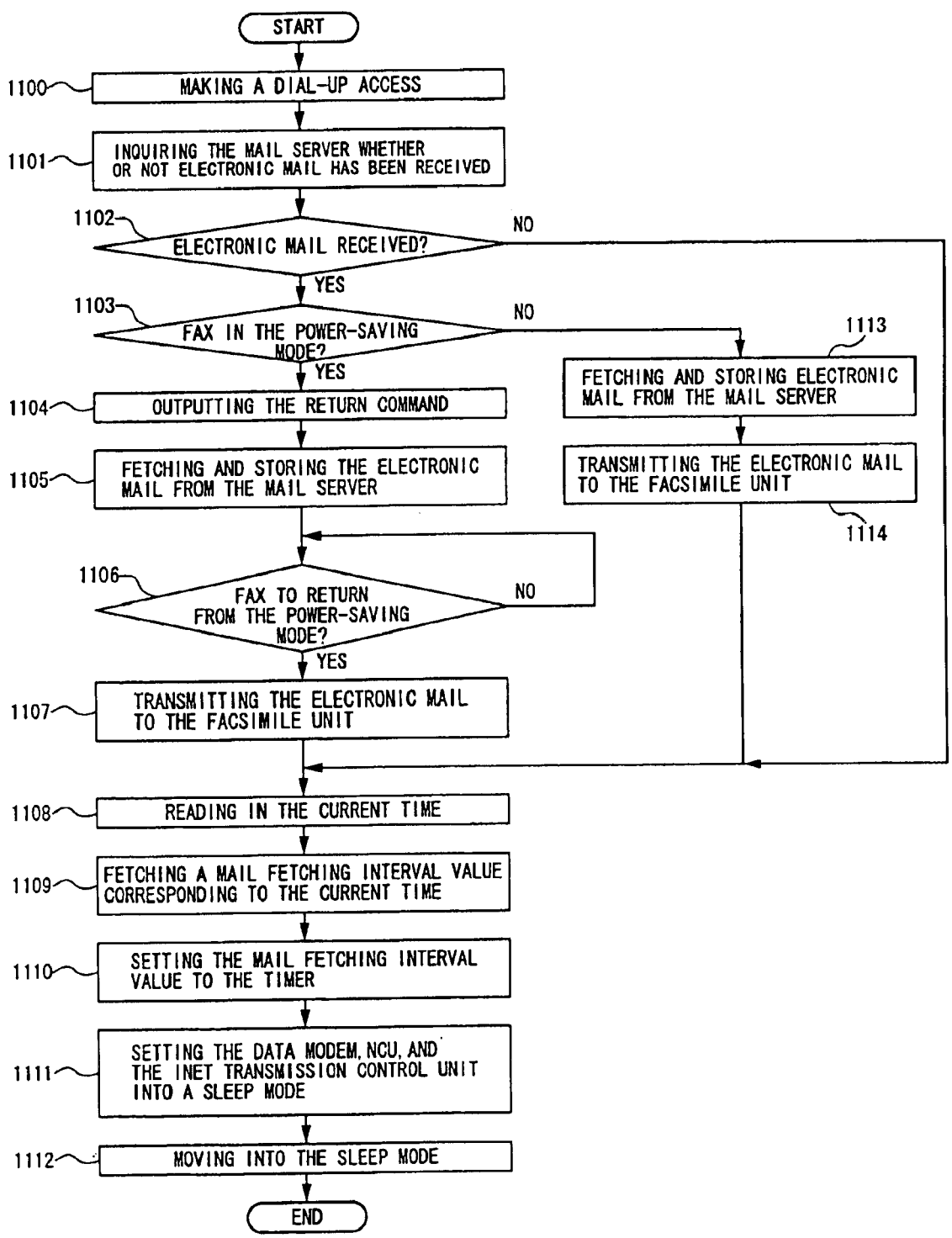
FIG. 19 is a flowchart of another example process performed by the dial-up unit DU when the timer activates the dial-up unit.

FIG. 19 is a flowchart of another example process performed by the dial-up unit DU when the timer 34 activates the dial-up unit DU.

First, the dial-up unit DU calls h Internet service provider ISP, and makes a dial-up access to the Internet INET in step 1100. The dial-up unit DU then communicates with the mail server SMa, and inquires whether or not any electronic mail addressed to the network facsimile device FXa is stored in step 1101. If there is some electronic mail addressed to the network facsimile device FXa ("YES" in step 1102), it is determined whether or not the facsimile nit FU is in the power-saving mode in step 1103.

If the result of stop 1103 is "YES", the dial-up unit DU outputs the return command signal SSt in step 1104. Electronic mail is fetched from the mail server SMa and then stored in step 1105. The dial-up connection to the Internet INET is then terminated, and the dial-up unit DU waits for the facsimile unit FU to return from the power-saving mode ("NO" in step 1106).

When the facsimile unit FU returns from the power-saving mode ("YES" in step 1106), the contents of the stored electronic mail are transmitted to the facsimile unit FU in step 1107.

The current time is then read in step 1108, and a mail fetching interval corresponding to the current time is inputted in step 1109. The inputted time data is set to the timer 34 in step 1110. The data modem 36, the network control unit 37, and the Internet transmission control unit 38 are then put into the sleep mode in step 1111. The CPU 31 also sets itself into the sleep mode in step 1112, and this operation then comes to an end.

Meanwhile, the result of step 1102 is "NO", the operation skips to step 1108, and the steps that follow are carried out. If there is no received electronic mail, the facsimile unit FU is not activated, thereby avoiding unnecessary power consumption.

If it is determined that the facsimile unit FU is not in the power-saving mode ("NO" in step 1103), electronic mail is fetched from the mail server SMa and then stored in step 1113. The contents of the stored electronic mail are transmitted to the facsimile unit FU in step 1114. After that, the operation skips to step 1108, and the steps that follow are then carried out.

In the above embodiment, the mail fetching intervals are fixed in the manner shown in FIG. 5. In FIG. 5, electronic mail fetching is not carried out in the time zone corresponding to the nighttime zone. However, there might be a request to fetch electronic mail in the nighttime zone. In such a case, electronic mail fetching can be carried out at intervals in the nighttime zone.

However, if electronic mail fetching is carried out in the nighttime zone, the mail fetching process needs to be repeated while electronic mail is not often received. This results in unnecessary power consumption.

To avoid such a situation, the mail fetching intervals can be prolonged to reduce unnecessary power consumption. Accordingly, a power-saving effect can be expected. In this case, the mail fetching intervals are gradually prolonged. Therefore, the upper limit should be set for the mail fetching intervals. Also, the prolonged mail fetching intervals should be reset to the original mail fetching intervals at the end of the nighttime zone.

Figure 20:
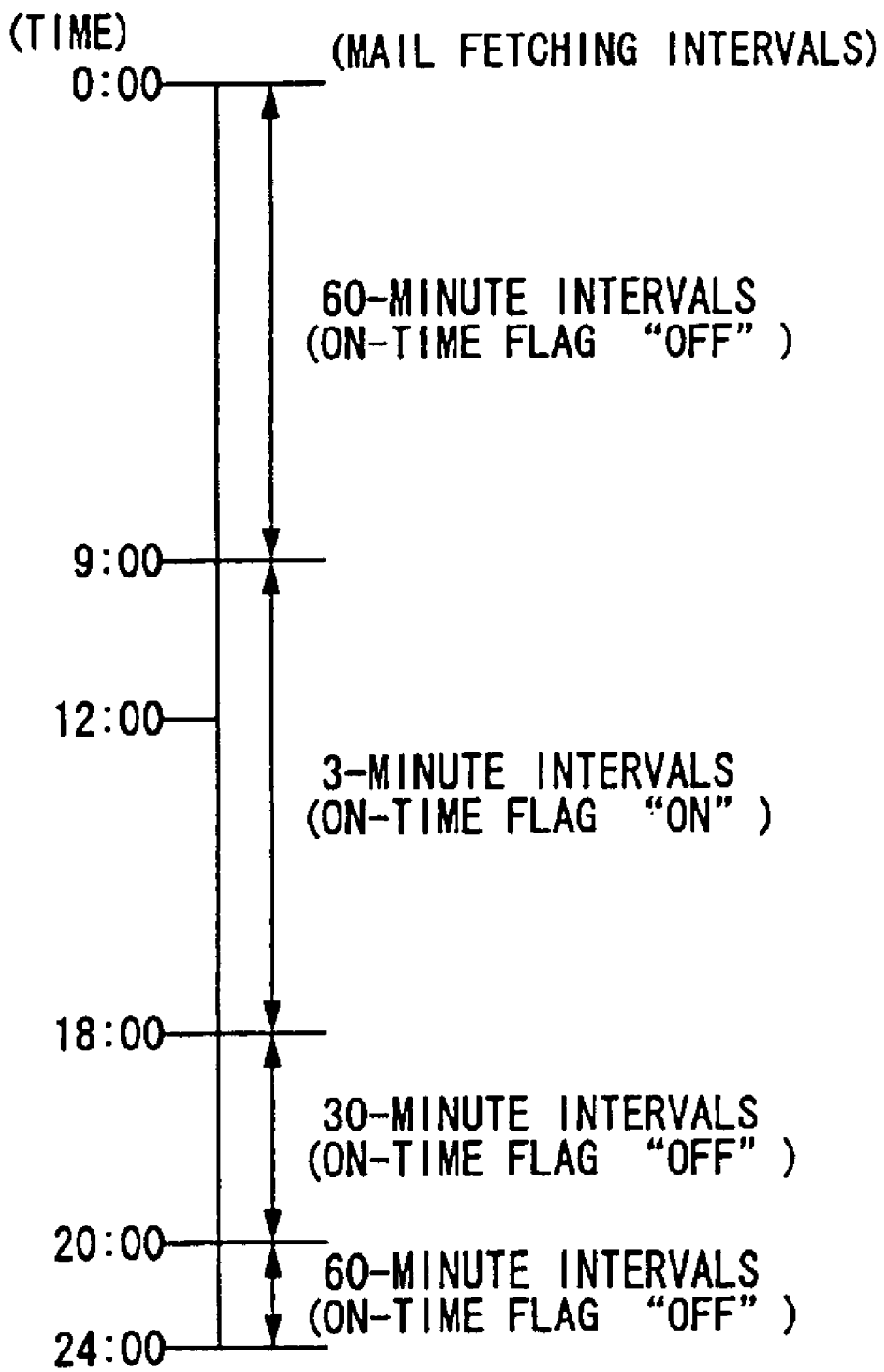
FIG. 20 shows an another example of mail fetching intervals.

FIG. 20 shows example mail fetching intervals. In this example, an on-time flag is set in each time zone. This on-time flag is used for distinguishing the nighttime zone from the normal operation time zone.

In the power-saving mode, the entire device is in the sleep mode, and it is necessary to store the current mail fetching intervals for calculating the next mail fetching intervals. Therefore, a modification is made to the structure of the local area network unit LU in the network facsimile device FX of FIG. 2. FIG. 21 shows the modified structure of the local area network unit LU. In FIG. 21, the same components as in FIG. 4 are denoted by the same reference numerals.

In this modification, the RAM 23 used as a work area of the CPU 21 is replaced by a non-volatile memory 23a, which is also used as a work area of the CPU 21.

Figure 22:
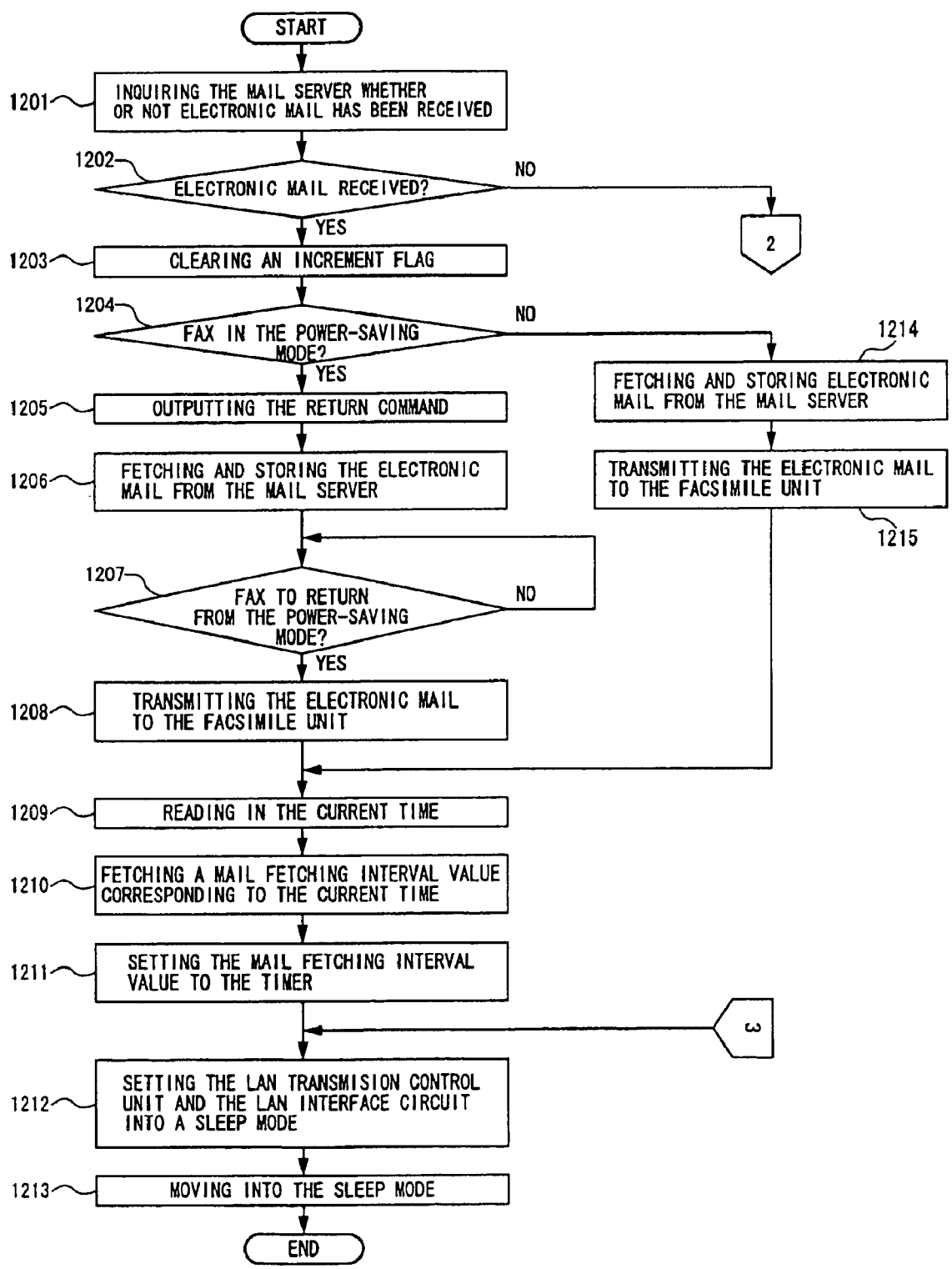
FIG. 22 is a flowchart of another example process performed by the local area network unit LU when the timer activates the local area network unit LU.
Figure 23:
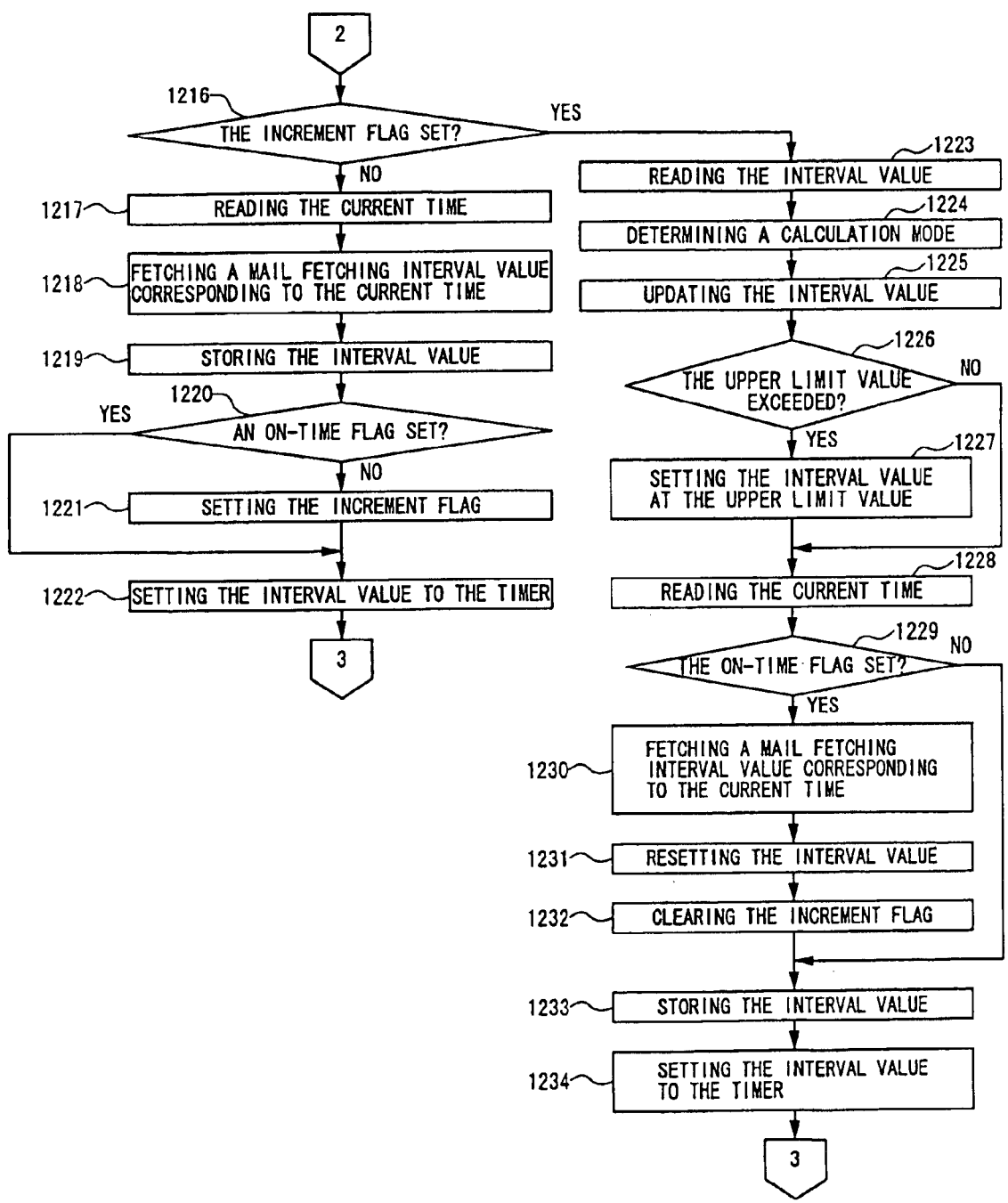
FIG. 23 is a flowchart continued from the flowchart of FIG. 22.

FIGS. 22 and 23 are a flowchart of an example process performed by the local area network unit LU when the timer 24 activates the local area network unit LU.

First, the local area network unit LU makes an access to the mail server SM to inquire whether or not any electronic mail addressed to the network facsimile device FX is stored in step 1201. If there is electronic mail addressed to the network facsimile device FX ("YES" in step 1202), an increment flag for specifying the operation mode for prolonging the mail fetching intervals is cleared in step 1203. Next, it is checked whether or not the facsimile unit FU is in the power-saving mode in step 1204.

If the result of step 1204 is "YES", the CPU 21 outputs the return command signal SSt in step 1205, and fetches electronic mail from the mail server SM in step 1206. The local area network unit LU then waits until the facsimile unit FU returns from the power-saving mode ("NO" in step 1207).

When the facsimile unit FU returns from the power-saving mode ("YES" in step 1207), the contents of the store electronic mail are transmitted to the facsimile unit in step 1208.

Next, the current time is read in step 1209, and a mail fetching interval corresponding to the current time is inputted in step 1210. The inputted time data are set to the timer 24 in step 1211. The local area network transmission control unit 26 and the local area network interface circuit 27 are then set into the sleep mode in step 1212. The CPU 21 also sets itself into the sleep mode in step 1213, and the operation then comes to an end.

Meanwhile, if the facsimile unit FU is not in the power-saving mode ("NO" in step 1204), electronic mail is fetched from the mail server SM and stored in step 1214. The contents of the stored electronic mail are transmitted to the facsimile unit FU in step 1215. The operation then skips to step 1209, and the steps that follow are carried out.

If the result of step 1202 is "NO", it is checked whether or not the increment flag is "ON" in step 1216. If the result of step 1216 is "NO", the next mail fetching intervals are set at a predetermined value (see FIG. 20). More specifically, the current time is read in step 1217, and the mail fetching interval corresponding to the current time is fetched in step 1218. The time data is then stored in step 1219.

Next, it is checked whether or not the on-time flag in the current time zone is "ON" in step 1220. If the result of step 1220 is "NO", the increment flag is set at "ON" in step 1221, because the mail fetching intervals can be prolonged. If the result of step 1220 is "YES", step 1221 is not carried out, and the increment flag is not set at "ON".

The time data stored in step 1219 is then set to the timer 24 in step 1222. The operation moves on to step 1212, and the steps that follow are carried out.

If the increment flag is "ON" (the result of step 1216 is "YES"), the stored time data is read in step 1223, and it is determined which calculation mode is designated by the user in step 1224. Examples of the calculation mode includes: N(n+1)=N(n)+KA (calculation mode 1; KA is a constant value); N(n+1)=N(n)+2KA (calculation mode 2; KA is a constant); and N(n+1)=N(n) (calculation mode 3; not to be prolonged). A user can select one of the calculation modes through a predetermined mode setting process.

Using the selected calculation mode, a mail fetching interval until the next mail fetching is calculated, and the mail fetching interval value is updated in step 1225. It is checked whether or not the updated mail fetching interval value exceeds the upper limit (120 minutes, for instance) in step 1226. If the updated mail fetching interval value exceeds the upper limit ("YES" in step 1226), the updated mail fetching interval value is reset at the upper limit value in step 1227.

Next, the current time is read in step 1228, and it is checked whether or not the on-time flag in the current time zone is "ON" in step 1229. If the on-time flag is "ON" ("YES" in step 1229), the mail fetching interval value corresponding to the current time is fetched in step 1230, because the mail fetching intervals cannot be prolonged in the current time zone. The mail fetching intervals are reset at the fetched mail fetching interval value in step 1231. Also, the increment flag is cleared in step 1232.

The mail fetching interval value calculated or set in the above is stored in step 1233, and the stored mail fetching interval value is set to the timer 24 in step 1234. The operation then moves on to step 1212, and the steps that follow are carried out.

Figure 24:
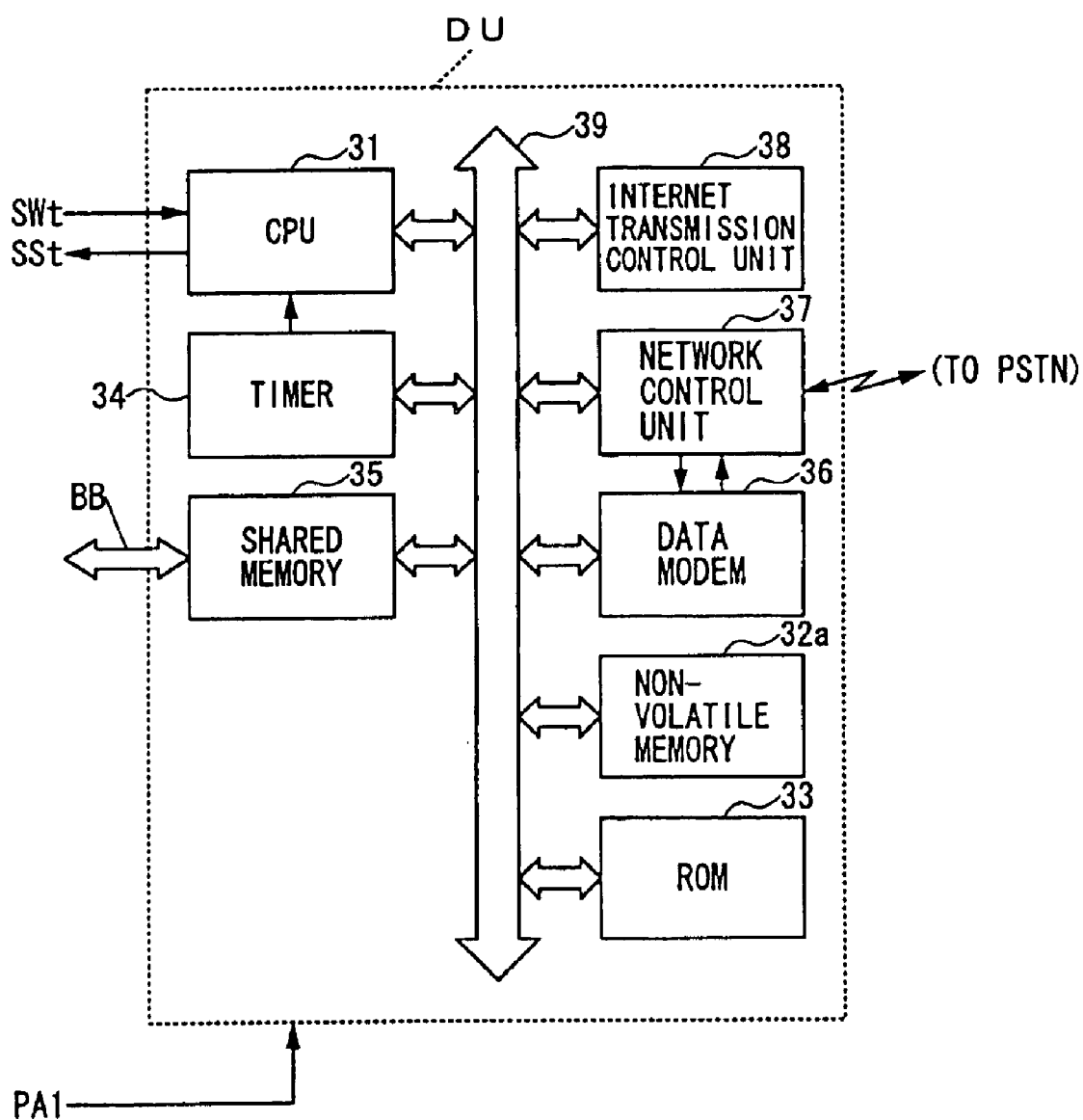
FIG. 24 is a block diagram of a modified structure of the dial-up unit DU.

A modification can also be made to the structure of the dial-up unit DU of the dial-up network facsimile device FXa of FIG. 11. FIG. 24 shows the modified structure of the dial-up unit DU. In this figure, the same components as in FIG. 12 are denoted by the same reference numerals.

In this modification, the RAM 32 used as a work area of the CPU 31 is replaced by a non-volatile memory 32a, which is also used as a work area of the CPU 31.

Figure 25:
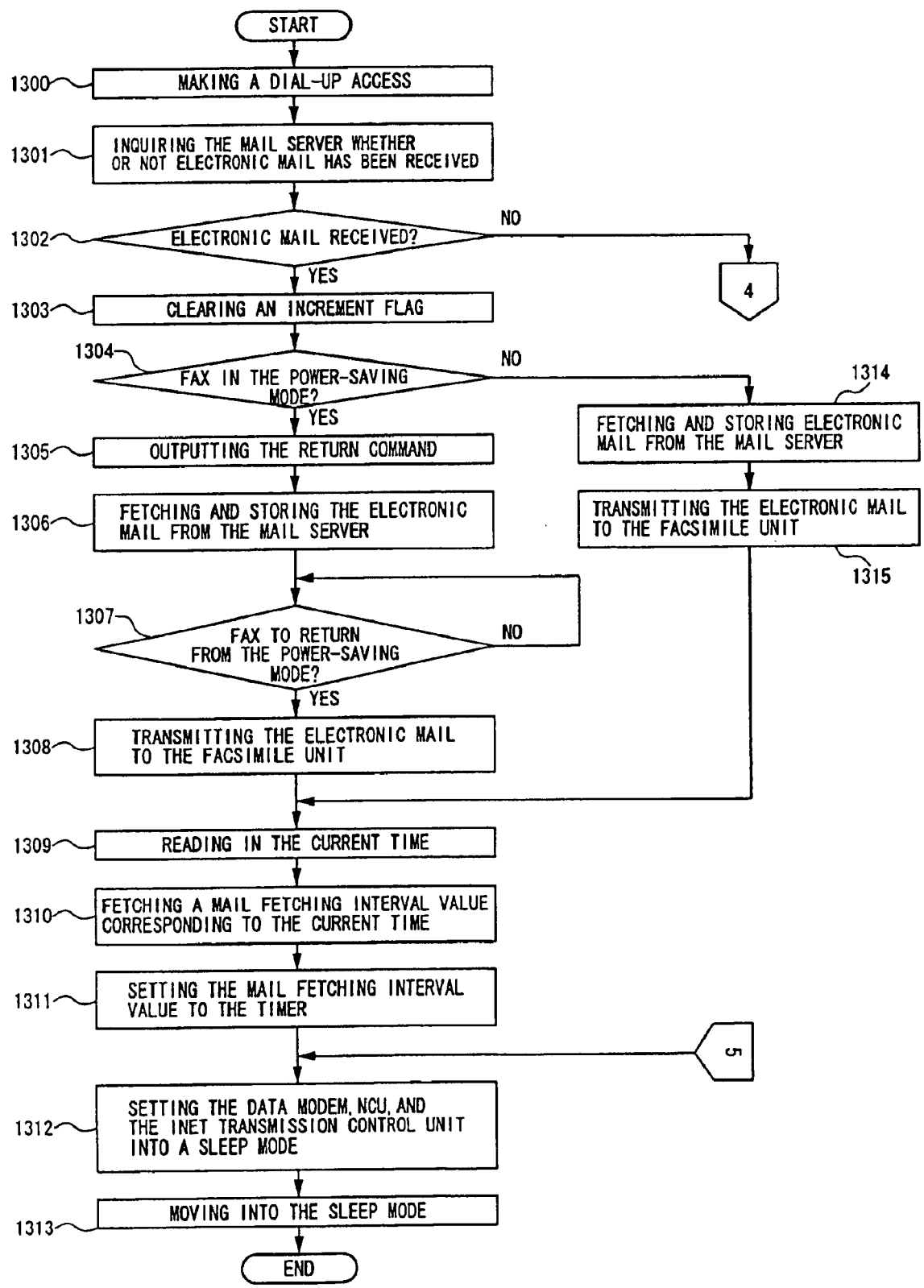
FIG. 25 is a flowchart of another example process performed by the dial-up unit DU when the timer activates the dial-up unit DU.
Figure 26:
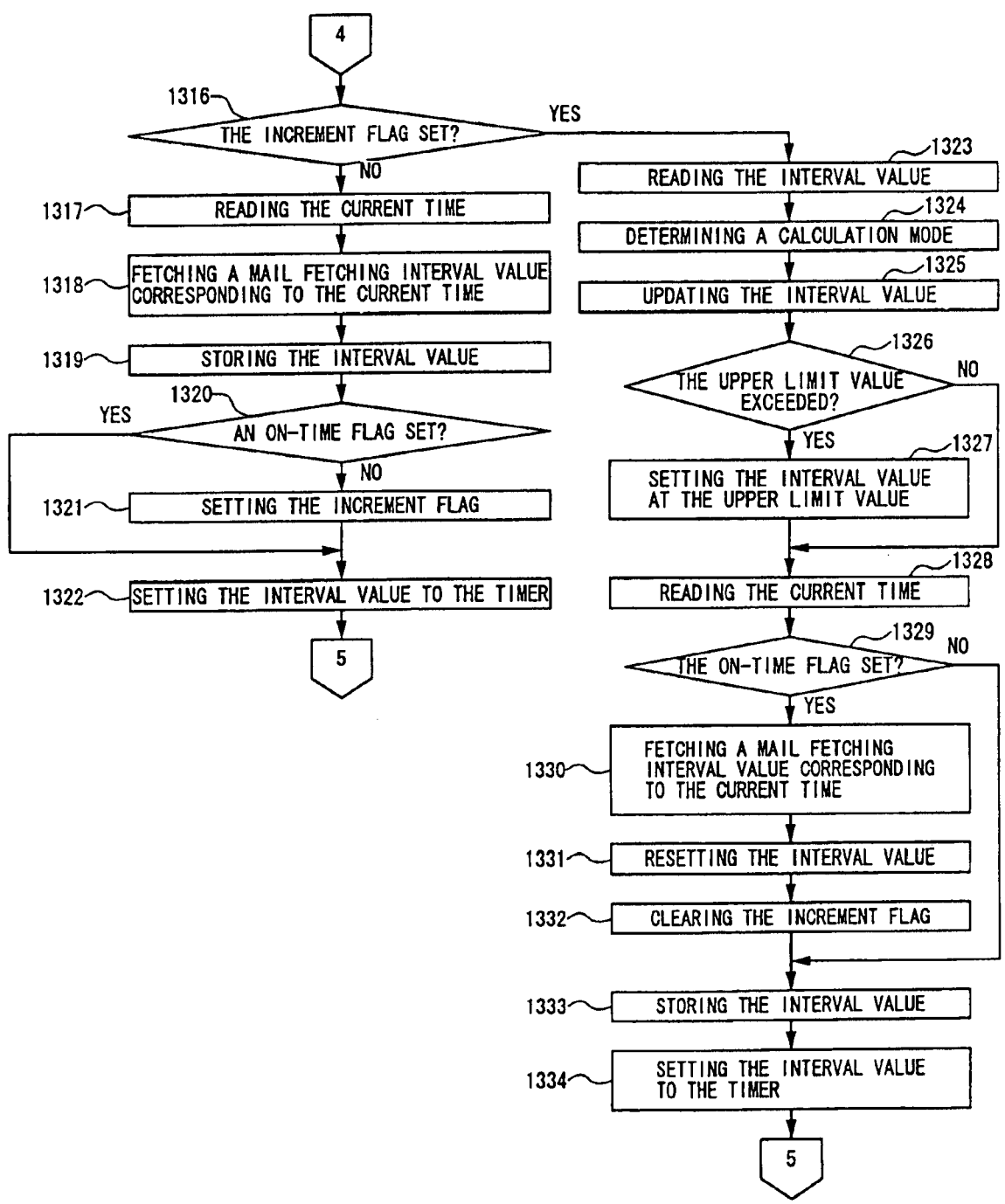
FIG. 26 is a flowchart continued from the flowchart of FIG. 25.

FIGS. 25 and 26 are a flowchart of an example process performed by the dial-up unit DU when the timer 34 activates the dial-up unit DU.

First, the dial-up unit DU calls the Internet service provider ISP, and makes a dial-up access to the Internet INET in step 1300. The dial-up unit DU then makes an access to the mail server SMa to inquire whether or not any electronic mail addressed to the network facsimile device FXa is stored in step 1301. If there is electronic mail addressed to the device FXa ("YES" in step 1302), an increment flag for specifying the operation mode for prolonging the mail fetching intervals is cleared in step 1303. It is then checked whether or not the facsimile unit FU is in the power-saving mode in step 1304.

If the result of step 1304 is "YES", the CPU 31 outputs the return command signal SSt in step 1305, and fetches and stores electronic mail from the mail server SMa in step 1306. The dial-up unit DU then waits until the facsimile unit FU returns from the power-saving mode ("NO" in step 1307).

When the facsimile unit FU returns from the power-saving mode ("YES" in step 1307), the contents of the stored electronic mail are transmitted to the facsimile unit FU in step 1308.

Next, the current time is read in the dial-up unit DU in step 1309, and a mail fetching interval corresponding to the current time is read in step 1310. The read time data is set to the timer 34 in step 1311. The data modem 36, the network control unit 37, and the Internet transmission control unit 38 are set into the sleep mode in step 1312. The CPU 31 also sets itself into the sleep mode in step 1313, and this operation then comes to an end.

Meanwhile, if the facsimile unit FU is not in the power-saving mode ("NO" in step 1304), the dial-up unit DU fetches and stores electronic mail from the mail server SMa in step 1314. The contents of the stored electronic mail are transmitted to the facsimile unit FU in step 1315. The operation then moves on to step 1309, and the steps that follow are carried out.

If the result of step 1302 is "NO", it is checked whether or not the increment flag is "ON" in step 1316. If the result of step 1316 is "NO", the next mail fetching intervals are set at a predetermined value (see FIG. 20). Accordingly, the current time is read in step 1317, and the mail fetching interval value corresponding to the current time is fetched in step 1318. The fetched mail fetching interval value is stored in step 1319.

It is then checked whether or not the on-time flag in the current time zone is "ON" in step 1320. If the result of step 1320 is "NO", the increment flag is set at "ON" in step 1321, because the mail fetching intervals can be prolonged. If the result of step 1320 is "YES", step 1321 is not carried out, and the increment flag is not set at "ON".

The mail fetching interval value stored in step 1319 is set to the timer 34 in step 1322. The operation then moves on to step 1312, and the steps that follow are carried out.

If the increment flag is set at "ON" ("YES" in step 1316), the stored mail fetching interval is read in step 1323, and it is determined which calculation mode is designated by the user in step 1324. Examples of the calculation mode includes: N(n+1)=N(n)+KA (calculation mode 1; KA is a constant value); N(n+1)=N(n)+2KA (calculation mode 2; KA is a constant); and N(n+1)=N(n) (calculation mode 3; not to be prolonged). A user can select one of the calculation modes through a predetermined mode setting process.

Using the selected calculation mode, a mail fetching interval until the next mail fetching is calculated, and the mail fetching interval value is updated in step 1325. It is checked whether or not the updated mail fetching interval value exceeds the upper limit (120 minutes, for instance) in step 1326. If the updated mail fetching interval value exceeds the upper limit ("YES" in step 1326), the updated mail fetching interval value is reset at the upper limit value in step 1327.

Next, the current time is read in step 1328, and it is checked whether or not the on-time flag in the current time zone is "ON" in step 1329. If the on-time flag is "ON" ("YES" in step 1329), the mail fetching interval value corresponding to the current time is fetched in step 1330, because the mail fetching intervals cannot be prolonged in the current time zone. The mail fetching intervals are reset at the fetched mail fetching interval value in step 1331. Also, the increment flag is cleared in step 1332.

The mail fetching interval value calculated or set in the above is stored in step 1333, and the stored mail fetching interval value is set to the timer 34 in step 1334. The operation then moves on to step 1312, and the steps that follow are carried out.

In the above embodiments, the network facsimile device is connected to an analog public network, but the present invention can also be applied to a case where the network facsimile device is connected to a digital public network (ISDN).

Also, in the above embodiments, a dial-up access is made to an analog public network, but the present invention can also be applied to a case where a dial-up access is made to a digital public network (ISDN).

Further, the present invention can be applied to any type of electronic mail terminal device that comprises a main unit and a local area network unit or a dial-up unit.

Also, the calculation mode formulas used for prolonging the mail fetching intervals are not limited to those mentioned in this specification, but any suitable formula can be employed.

On the whole, the present invention is not limited to the specifically disclosed embodiments, but variations and modifications may be made without departing from the scope of the present invention.

The present invention is based on Japanese priority application Nos. 11-194746, filed on Jul. 8, 1999, and 11-271054, filed on Sep. 24, 1999, the entire contents of which are hereby incorporated by reference.

What is claimed is:

1. An electronic mail terminal device that transmits and receives information through electronic mail, comprising:

a communication unit connected to a network and performing electronic mail data exchange via the network; and a power-saving control unit configured to set the communication unit and said device into a power-saving mode when said device detects that a first power-saving condition is satisfied, and the power-saving control unit being configured to cancel the power-saving mode when said device detects that a second power-saving condition is satisfied, wherein the communication unit is a local area network communication unit that is connected to a local area network and performs electronic data exchange via the local area network, the first power-saving timing condition is that a stand-by state lasts longer than a predetermined period of time, the second power-saving timing condition is that an event occurs, the power-saving control unit cancels the power-saving mode at predetermined mail fetching intervals so as to fetch electronic mail addressed to said device through the local area network communication unit, the power-saving control unit cancels the power-saving mode of the local area network communication unit at the predetermined mail fetching intervals so as to fetch electronic mail addressed to said device through the local area network communication unit, where electronic mail has been fetched, the power-saving control unit canceling the power-saving mode of said device and outputting electronic mail information to said device through the local area network communication unit, and where no electronic mail has been fetched, the power-saving control unit not canceling the power-saving mode of said device, and setting the local area network communication unit back into the power-saving mode after a stand-by state lasts longer than the predetermined period of time.

2. An electronic mail terminal device that transmits and receives information through electronic mail, comprising:

a communication unit connected to a network and performing electronic mail data exchange via the network; and a power-saving control unit configured to set the communication unit and said device into a power-saving mode when said device detects that a first power-saving condition is satisfied, and the power-saving control unit being configured to cancel the power-saving mode when said device detects that a second power-saving condition is satisfied, wherein the communication unit is a local area network communication unit that is connected to a local area network and performs electronic data exchange via the local area network, the first power-saving timing condition is that a stand-by state lasts longer than a predetermined period of time, the second power-saving timing condition is that an event occurs, the power-saving control unit cancels the power-saving mode at predetermined mail fetching intervals so as to fetch electronic mail addressed to said device through the local area network communication unit, and the mail fetching intervals have a different value set in each time zone.

3. An electronic mail terminal device that transmits and receives information through electronic mail, comprising:

a communication unit connected to a network and performing electronic mail data exchange via the network; and a power-saving control unit configured to set the communication unit and said device into a power-saving mode when said device detects that a first power-saving condition is satisfied, and the power-saving control unit being configured to cancel the power-saving mode when said device detects that a second power-saving condition is satisfied, wherein the communication unit is a dial-up communication unit that makes a dial-up access to an Internet service provide via a public network, and performs electronic mail data exchange via the Internet, the first power-saving timing condition is that a stand-by state lasts longer than a predetermined period of time, the second power-saving timing condition is that an event occurs, the power-saving control unit cancels the power-saving mode at predetermined mail fetching intervals so as to fetch electronic mail addressed to said device through the dial-up communication unit, the power-saving control unit cancels the power-saving mode of the dial-up communication unit at the predetermined mail fetching intervals so as to fetch electronic mail addressed to said device, where electronic mail has been fetched, the power-saving control unit canceling the power-saving mode of said device and outputting electronic mail information to said device through the dial-up communication unit, and where no electronic mail has been fetched, the power-saving control unit not canceling the power-saving mode of said device and then setting the dial-up communication unit back into the power-saving mode after a stand-by state lasts longer than the predetermined period of time.

4. An electronic mail terminal device that transmits and receives information through electronic mail, comprising:

a communication unit connected to a network and performing electronic mail data exchange via the network; and a power-saving control unit configured to set the communication unit and said device into a power-saving mode when said device detects that a first power-saving condition is satisfied, and the power-saving control unit being configured to cancel the power-saving mode when said device detects that a second power-saving condition is satisfied, wherein the communication unit is a dial-up communication unit that makes a dial-up access to an Internet service provide via a public network, and performs electronic mail data exchange via the Internet, the first power-saving timing condition is that a stand-by state lasts longer than a predetermined period of time, the second power-saving timing condition is that an event occurs, the power-saving control unit cancels the power-saving mode at predetermined mail fetching intervals so as to fetch electronic mail addressed to said device through the dial-up communication unit, the mail fetching intervals have a different value set in each time zone.

5. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a local area network communication unit, which is connected to a local area network and performs electronic mail data exchange via the local area network, into the power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the local area network communication unit, the canceling step includes the step of canceling the power-saving mode of the local area network communication unit at the predetermined mail fetching intervals so as to fetch electronic mail addressed to said device through the local area network communication unit, said method further comprising the steps of:

where electronic mail has been fetched, outputting electronic mail information to said device through the local area network communication unit after canceling the power-saving mode of said device; and where no electronic mail has been fetched, setting the local area network communication unit back into the power-saving mode when a stand-by state lasts longer than the predetermined period of time, not canceling the power-saving mode of said device.

6. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a local area network communication unit, which is connected to a local area network and performs electronic mail data exchange via the local area network, into the power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the local area network communication unit, the canceling step includes the step of setting a different value in each time zone for the mail fetching intervals.

7. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a dial-up communication unit, which makes an dial-up access to an Internet service provider via a public network and performs electronic mail data exchange via the Internet, into a power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the dial-up communication unit, the canceling step includes the step of canceling the power-saving mode of the dial-up communication unit at the predetermined mail fetching intervals so as to fetch electronic mail addressed to said device, said method further comprising the steps of:

where electronic mail has been fetched, outputting electronic mail information to said device through the dial-up communication unit after canceling the power-saving mode of said device; and where no electronic mail has been fetched, setting the dial-up communication unit back into the power-saving mode when a stand-by state lasts longer than the predetermined period of time, not canceling the power-saving mode of said device.

8. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a dial-up communication unit, which makes an dial-up access to an Internet service provider via a public network and performs electronic mail data exchange via the Internet, into a power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the dial-up communication unit, the canceling step includes the step of setting a different value in each time zone for the mail fetching intervals.

9. An electronic mail terminal device that transmits and receives information through electronic mail, comprising:

a communication unit connected to a network and performing electronic mail data exchange via the network; and a power-saving control unit configured to set the communication unit and said device into a power-saving mode when said device detects that a first power-saving condition is satisfied, and the power-saving control unit being configured to cancel the power-saving mode when said device detects that a second power-saving condition is satisfied, wherein the communication unit is a local area network communication unit that is connected to a local area network and performs electronic data exchange via the local area network, the first power-saving timing condition is that a stand-by state lasts longer than a predetermined period of time, the second power-saving timing condition is that an event occurs, the power-saving control unit cancels the power-saving mode at predetermined mail fetching intervals so as to fetch electronic mail addressed to said device through the local area network communication unit, the power-saving control unit cancels the power-saving mode of the local area network communication unit at the predetermined mail fetching intervals so as to fetch electronic mail addressed to said device through the local area network communication unit; and where no electronic mail has been fetched, the power-saving control unit prolongs the mail fetching intervals by a prescribed arithmetic operation.

10. The electronic mail terminal device as claimed in claim 9, wherein:

where electronic mail has been fetched, the power-saving control unit resets the mail fetching intervals to the original predetermined mail fetching intervals.

11. The electronic mail terminal device as claimed in claim 10, wherein:

where no electronic mail has been fetched, the power-saving control unit prolongs the mail fetching intervals by a prescribed arithmetic operation, not canceling the power-saving mode of said device, and sets the local area network communication unit back into the power-saving mode when a stand-by state lasts longer than the predetermined period of time, and where electronic mail has been fetched, the power-saving control units cancels the power-saving mode of said device, outputs electronic mail information to said device through the local area network communication unit, and then resets the mail fetching intervals to the original predetermined mail fetching intervals.

12. The electronic mail terminal device as claimed in claim 10, further comprising a semiconductor non-volatile memory that stores the mail fetching intervals.

13. The electronic mail terminal device as claimed in claim 10, wherein the arithmetic operation is selected from a plurality of prescribed arithmetic operations by a user.

14. The electronic mail terminal device as claimed in claim 9, wherein:

where no electronic mail has been fetched, the power-saving control unit prolongs the mail fetching intervals by the prescribed arithmetic operation, and resets the mail fetching intervals to the original predetermined mail fetching intervals at a predetermined time.

15. The electronic mail terminal device as claimed in claim 14, wherein:

where no electronic mail has been fetched, the power-saving control unit prolongs the mail fetching intervals by the prescribed arithmetic operation, not canceling the power-saving mode of said device, and then sets the local area network communication unit back into the power-saving mode when a stand-by state lasts longer than the predetermined period of time;

where electronic mail has been fetched, the power-saving control unit cancels the power-saving mode of said device, and outputs electronic mail information to said device through the local area network communication unit; and at the predetermined time, the power-saving control unit resets the mail fetching intervals to the original predetermined mail fetching intervals.

16. The electronic mail terminal device as claimed in claim 14, further comprising a semiconductor non-volatile memory that stores the mail fetching intervals.

17. The electronic mail terminal device as claimed in claim 14, wherein the arithmetic operation is selected from a plurality of prescribed arithmetic operations by a user.

18. An electronic mail terminal device that transmits and receives information through electronic mail, comprising:

a communication unit connected to a network and performing electronic mail data exchange via the network; and a power-saving control unit configured to set the communication unit and said device into a power-saving mode when said device detects that a first power-saving condition is satisfied, and the power-saving control unit being configured to cancel the power-saving mode when said device detects that a second power-saving condition is satisfied, wherein the communication unit is a dial-up communication unit that makes a dial-up access to an Internet service provide via a public network, and performs electronic mail data exchange via the Internet, the first power-saving timing condition is that a stand-by state lasts longer than a predetermined period of time, the second power-saving timing condition is that an event occurs, the power-saving control unit cancels the power-saving mode at predetermined mail fetching intervals so as to fetch electronic mail addressed to said device through the dial-up communication unit, the power-saving control unit cancels the power-saving mode of the dial-up communication unit at the predetermined mail fetching intervals so as to fetch electronic mail addressed to said device through the dial-up communication unit;

where no electronic mail has been fetched, the power-saving control unit prolongs the mail fetching intervals by a prescribed arithmetic operation; and where electronic mail has been fetched, the power-saving control unit resets the mail fetching intervals to the original predetermined mail fetching intervals.

19. The electronic mail terminal device as claimed in claim 18, wherein:

where no electronic mail has been fetched, the power-saving control unit prolongs the mail fetching intervals by a prescribed arithmetic operation, not canceling the power-saving mode of said device, and sets the dial-up communication unit back into the power-saving mode when a stand-by state lasts longer than the predetermined period of time; and where electronic mail has been fetched, the power-saving control unit cancels the power-saving mode of said device, outputs electronic mail information to said device through the dial-up communication unit, and then resets the mail fetching intervals to the original predetermined mail fetching intervals.

20. The electronic mail terminal device as claimed in claim 18, wherein:

where no electronic mail has been fetched, the power-saving control unit prolongs the mail fetching intervals by the prescribed arithmetic operation, and resets the mail fetching intervals to the original predetermined mail fetching intervals at a predetermined time.

21. The electronic mail terminal device as claimed in claim 20, wherein:

where no electronic mail has been fetched, the power-saving control unit prolongs the mail fetching intervals by the prescribed arithmetic operation, not canceling the power-saving mode of said device, and sets the dial-up communication unit back into the power-saving mode when a stand-by state lasts longer than the predetermined period of time, where electronic mail has been fetched, the power-saving control unit cancels the power-saving mode of said device, and outputs electronic mail information to said device through the dial-up communication unit; and at the predetermined time, the power-saving control unit resets the mail fetching intervals to the original predetermined mail fetching intervals.

22. The electronic mail terminal device as claimed in claim 20, further comprising a semiconductor non-volatile memory that stores the mail fetching intervals.

23. The electronic mail terminal device as claimed in claim 20, wherein the arithmetic operation is selected from a plurality of prescribed arithmetic operations by a user.

24. The electronic mail terminal device as claimed in claim 18, further comprising a semiconductor non-volatile memory that stores the mail fetching intervals.

25. The electronic mail terminal device as claimed in claim 18, wherein the arithmetic operation is selected from a plurality of prescribed arithmetic operations by a user.

26. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a local area network communication unit, which is connected to a local area network and performs electronic mail data exchange via the local area network, into the power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the local area network communication unit, the canceling step includes the step of canceling the power-saving mode of the local area network communication unit at the predetermined mail fetching intervals so as to fetch electronic mail addressed to said device through the local area network communication unit, said method further comprising the steps of, where no electronic mail has been fetched, prolonging the mail fetching intervals by a prescribed arithmetic operation.

27. The method as claimed in claim 26, further comprising the step of, where electronic mail has been fetched, resetting the prolonged mail fetching intervals to the original predetermined mail fetching intervals.

28. The method as claimed in claim 27, wherein the mail fetching intervals are stored in a semiconductor non-volatile memory.

29. The method as claimed in claim 27, wherein the arithmetic operation is selected from a plurality of prescribed arithmetic operations by a user.

30. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a local area network communication unit, which is connected to a local area network and performs electronic mail data exchange via the local area network, into the power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the local area network communication unit, the canceling step includes the step of canceling the power-saving mode of the local area network communication unit at the predetermined mail fetching intervals so as to fetch electronic mail addressed to said device through the local area network communication unit, said method further comprising the steps of:
where no electronic mail has been fetched, prolonging the mail fetching intervals by the prescribed arithmetic operation, not canceling the power-saving mode of said device, and then setting the local area network communication unit back into the power-saving mode when a stand-by state lasts longer than the predetermined period of time; and
where electronic mail has been fetched, canceling the power-saving mode of said device, outputting electronic mail information to said device through the local area network communication unit, and then resetting the mail fetching intervals to the original predetermined mail fetching intervals.

31. A method of controlling an electronic mail terminal device that transmits and receives information through electronic mail, said method comprising the steps of:
setting said electronic mail terminal device and a communication unit of said electronic mail terminal device, which is connected to a network and performs electronic mail data exchange via the network, into a power-saving mode, when said device detects that a first power-saving timing condition is satisfied; and
canceling the power-saving mode when said device detects that a second power-saving timing condition is satisfied,
wherein the power-saving mode setting step includes the step of setting said device and a dial-up communication unit, which makes an dial-up access to an Internet service provider via a public network and performs electronic mail data exchange via the Internet, into a power-saving mode, when a stand-by state lasts longer than a predetermined period of time,
the canceling step includes the step of canceling the power-saving mode when an event occurs,
the canceling step includes the step of canceling the power-saving mode at predetermined mail fetching intervals so as to fetch electronic mail addressed to said device through the dial-up communication unit,
the canceling step includes the step of canceling the power-saving mode of the dial-up communication unit at the mail fetching intervals so as to fetch electronic mail addressed to said device through the dial-up communication unit,
said method further comprising the steps of:
where no electronic mail has been fetched, prolonging the mail fetching intervals by a prescribed arithmetic operation; and
where electronic mail has been fetched, resetting the prolonged mail fetching intervals to the original predetermined mail fetching intervals.

32. The method as claimed in claim 31, wherein the mail fetching intervals are stored in a semiconductor non-volatile memory.

33. The method as claimed in claim 31, wherein the arithmetic operation is selected from a plurality of prescribed arithmetic operations by a user.

34. A method of controlling an electronic mail terminal device that transmits and receives information through electronic mail, said method comprising the steps of:
setting said electronic mail terminal device and a communication unit of said electronic mail terminal device, which is connected to a network and performs electronic mail data exchange via the network, into a power-saving mode, when said device detects that a first power-saving timing condition is satisfied; and
canceling the power-saving mode when said device detects that a second power-saving timing condition is satisfied,
wherein the power-saving mode setting step includes the step of setting said device and a dial-up communication unit, which makes an dial-up access to an Internet service provider via a public network and performs electronic mail data exchange via the Internet, into a power-saving mode, when a stand-by state lasts longer than a predetermined period of time,
the canceling step includes the step of canceling the power-saving mode when an event occurs,
the canceling step includes the step of canceling the power-saving mode at predetermined mail fetching intervals so as to fetch electronic mail addressed to said device through the dial-up communication unit,
the canceling step includes the step of canceling the power-saving mode of the dial-up communication unit at the mail fetching intervals so as to fetch electronic mail addressed to said device through the dial-up communication unit,
said method further comprising the steps of:
where no electronic mail has been fetched, prolonging the mail fetching intervals by a prescribed arithmetic operation, not canceling the power-saving mode of said device, and then setting the dial-up communication unit back into the power-saving mode when a stand-by state lasts longer than the predetermined period of time; and
where electronic mail has been fetched, canceling the power-saving mode of said device, outputting electronic mail information to said device through the dial-up communication unit, and then resetting the prolonged mail fetching intervals to the original predetermined mail fetching intervals.

35. A method of controlling an electronic mail terminal device that transmits and receives information through electronic mail, said method comprising the steps of:
setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a local area network communication unit, which is connected to a local area network and performs electronic mail data exchange via the local area network, into the power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the local area network communication unit, the canceling step includes the step of canceling the power-saving mode of the local area network communication unit at the predetermined mail fetching intervals so as to fetch electronic mail addressed to said device through the local area network communication unit;

said method further comprising the steps of:
where no electronic mail has been fetched, prolonging the mail fetching intervals by a prescribed arithmetic operation; and
at a predetermined time, resetting the prolonged mail fetching intervals to the original predetermined mail fetching intervals.

36. The method as claimed in claim 35, wherein the mail fetching intervals are stored in a semiconductor no-volatile memory.

37. The method as claimed in claim 35, wherein the arithmetic operation is selected from a plurality of prescribed arithmetic operations by a user.

38. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a local area network communication unit, which is connected to a local area network and performs electronic mail data exchange via the local area network, into the power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the local area network communication unit, the canceling step includes the step of canceling the power-saving mode of the local area network communication unit at the predetermined mail fetching intervals so as to fetch electronic mail addressed to said device through the local area network communication unit, said method further comprising the steps of:
where no electronic mail has been fetched, prolonging the mail fetching intervals by a prescribed arithmetic operation, not canceling the power-saving mode of said device, and then setting the local area network communication unit back into the power-saving mode when a stand-by state lasts longer than the predetermined period of time;
where electronic mail has been fetched, canceling the power-saving mode of said device, and outputting electronic mail information to said device; and
at a predetermined time, resetting the mail fetching intervals to the original predetermined mail fetching intervals.

39. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a dial-up communication unit, which makes an dial-up access to an Internet service provider via a public network and performs electronic mail data exchange via the Internet, into a power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the dial-up communication unit, the canceling step includes the step of canceling the power-saving mode of the dial-up communication unit at the mail fetching intervals so as to fetch electronic mail addressed to said device through the dial-up communication unit, said method further comprising the steps of:
where no electronic mail has been fetched, prolonging the mail fetching intervals by a prescribed arithmetic operation; and
at a predetermined time, resetting the prolonged mail fetching intervals to the original predetermined mail fetching intervals.

40. The method as claimed in claim 39, wherein the mail fetching intervals are stored in a semiconductor non-volatile memory.

41. The method as claimed in claim 39, wherein the arithmetic operation is selected from a plurality of prescribed arithmetic operations by a user.

42. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein the power-saving mode setting step includes the step of setting said device and a dial-up communication unit, which makes an dial-up access to an Internet service provider via a public network and performs electronic mail data exchange via the Internet, into a power-saving mode, when a stand-by state lasts longer than a predetermined period of time, the canceling step includes the step of canceling the power-saving mode when an event occurs, the canceling step includes the step of canceling the power-saving mode at predetermined mail fetching intervals so as to fetch electronic mail addressed to said device through the dial-up communication unit, the canceling step includes the step of canceling the power-saving mode of the dial-up communication unit at the mail fetching intervals so as to fetch electronic mail addressed to said device through the dial-up communication unit, said method further comprising the steps of:
where no electronic mail has been fetched, prolonging the mail fetching intervals by a prescribed arithmetic operation, non canceling the power-saving mode of said device, and then setting the dial-up communication unit back into the power-saving mode when a stand-by state lasts longer than the predetermined period of time;

where electronic mail has been fetched, canceling the power-saving mode of said device, and outputting electronic mail information to said device through the dial-up communication unit; and at a predetermined time, resetting the mail fetching intervals to the original predetermined mail fetching intervals.

43. An electronic mail terminal device that transmits and receives information through electronic mail, comprising:
a communication unit connected to a network and performing electronic mail data exchange via the network; and
a power-saving control unit configured to set the communication unit and said device into a power-saving mode when said device detects that a first power-saving condition is satisfied, and the power-saving control unit being configured to cancel the power-saving mode when said device detects that a second power-saving condition is satisfied,
wherein:
the communication unit is a local area network communication unit that is connected to a local area network and performs electronic mail data exchange via the local area network;
when a current time is within a predetermined nighttime zone, the power-saving control unit sets the local area network and said device into the power-saving mode; and
when the current time comes out of the predetermined nighttime zone, the power-saving control unit cancels the power-saving mode of the local area network communication unit.

44. The electronic mail terminal device as claimed in claim 43, further comprising a nighttime power-saving mode setting unit that determines whether or not a power-saving mode can be set in the predetermined nighttime zone,
wherein:
when the current time is within the predetermined nighttime zone, the power-saving control unit sets said device into the power-saving mode;
when the nighttime power-saving mode setting unit allows the power-saving mode in the nighttime zone, the power-saving control unit sets the local area network communication unit into the power-saving mode; and
when the current time comes out of the nighttime zone, the power-saving control unit cancels the power-saving mode of the local area network communication unit.

45. The electronic mail terminal device as claimed in claim 43, wherein
the power-saving control unit is provided with a timer for detecting an end of the nighttime zone, and, based on an output of the timer, cancels the power-saving mode of the local area network communication unit.

46. An electronic mail terminal device that transmits and receives information through electronic mail, comprising:
a communication unit connected to a network and performing electronic mail data exchange via the network; and
a power-saving control unit configured to set the communication unit and said device into a power-saving mode when said device detects that a first power-saving condition is satisfied, and the power-saving control unit being configured to cancel the power-saving mode when said device detects that a second power-saving condition is satisfied,
wherein:
the communication unit is a dial-up communication unit that makes a dial-up access to an Internet service provider via a public network and performs electronic mail data exchange via the Internet;
when a current time is within a predetermined nighttime zone, the power-saving control unit sets the dial-up communication unit and said device into the power-saving mode; and
when the current time comes out of the predetermined nighttime zone, the power-saving control unit cancels the power-saving mode of the dial-up communication unit.

47. The electronic mail terminal device as claimed in claim 46, further comprising:
a nighttime power-saving mode setting unit that determined whether or not a power-saving mode can 5 be set in the predetermined nighttime zone,
wherein:
when the current time is within the predetermined nighttime zone, the power-saving control unit sets said device into the power-saving mode;
when the nighttime power-saving mode setting unit allows the power-saving mode in the nighttime zone, the power-saving control unit sets the dial-up communication unit into the power-saving mode; and
when the current time comes out of the nighttime zone, the power-saving control unit cancels the power-saving mode of the dial-up communication unit.

48. The electronic mail terminal device as claimed in claim 46, wherein
the power-saving control unit is provided with a timer for detecting an end of the nighttime zone, and, based on an output of the timer, cancels the power-saving mode of the dial-up communication unit.

49. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein:
the power-saving mode setting step includes the step of setting said device and a local area network communication unit, which is connected to a local area network and performs electronic mail data exchange via the local area network, into the power-saving mode, when a current time is within a predetermined nighttime zone; and the canceling step includes the step of canceling the power-saving mode of the local area network communication unit when the current time comes out of the predetermined nighttime zone.

50. The method as claimed in claim 49, wherein:

the power-saving mode setting step includes the steps of:
when the current time is within the predetermined nighttime zone, setting said device into the power-saving mode; and when a nighttime power-saving mode setting unit determines that a power-saving mode can be set in the nighttime zone, setting the local area network communication unit into the power-saving mode; and the canceling step includes the step of,
when the current time comes out of the night time zone, canceling the power-saving mode of the local area network communication unit.

51. The method as claimed in claim 49, wherein the canceling step includes the step of, based on an output of a timer that detects an end of the nighttime zone, canceling the power-saving mode of the local area network communication unit.

52. A method of controlling an electronic mail terminal device that transmits and receives information through electronic mail, said method comprising the steps of:

setting said electronic mail terminal device and a communication unit of said electronic mail terminal device, which is connected to a network and performs electronic mail data exchange via the network, into a power-saving mode, when said device detects that a first power-saving timing condition is satisfied; and canceling the power-saving mode when said device detects that a second power-saving timing condition is satisfied, wherein:
the power-saving mode setting step includes the step of setting said device and a dial-up communication unit, which makes a dial-up access to an Internet service provider via a public network and performs electronic mail data exchange via the Internet, into the power-saving mode, when a current time is within a predetermined nighttime zone; and the canceling step includes the step of canceling the power-saving mode of the dial-up communication unit when the current time comes out of the predetermined nighttime zone.

53. The method as claimed in claim 52, wherein:

the power-saving mode setting step includes the steps of:
when the current time is within the predetermined nighttime zone, setting said device into the power-saving mode; and when a nighttime power-saving mode setting unit determines that a power-saving mode can be set in the nighttime zone, setting the dial-up communication unit into the power-saving mode; and the canceling step includes the step of,
when the current time comes out of the night time zone, canceling the power-saving mode of the dial-up communication unit.

54. The method as claimed in claim 52, wherein the canceling step includes the step of, based on an output of a timer that detects an end of the nighttime zone, canceling the power-saving mode of the dial-up communication unit.

* * * * *